(12) United States Patent
Sakane et al.

(10) Patent No.: US 11,546,683 B2
(45) Date of Patent: Jan. 3, 2023

(54) ACOUSTIC OUTPUT DEVICE

(71) Applicant: SONY CORPORATION, Tokyo (JP)

(72) Inventors: Keita Sakane, Chiba (JP); Yoshihisa Kadosawa, Chiba (JP); Yuki Shimizu, Tokyo (JP)

(73) Assignee: SONY CORPORATION, Tokyo (JP)

(*) Notice: Subject to any disclaimer, the term of this patent is extended or adjusted under 35 U.S.C. 154(b) by 250 days.

(21) Appl. No.: 16/956,887

(22) PCT Filed: Nov. 7, 2018

(86) PCT No.: PCT/JP2018/041367
§ 371 (c)(1),
(2) Date: Jun. 22, 2020

(87) PCT Pub. No.: WO2019/130843
PCT Pub. Date: Jul. 4, 2019

(65) Prior Publication Data
US 2021/0067859 A1 Mar. 4, 2021

(30) Foreign Application Priority Data

Dec. 29, 2017 (JP) .............................. JP2017-255175
Oct. 1, 2018 (JP) .............................. JP2018-186760

(51) Int. Cl.
*H01Q 1/24* (2006.01)
*H04R 1/10* (2006.01)
(Continued)

(52) U.S. Cl.
CPC ............. *H04R 1/1008* (2013.01); *H01Q 1/24* (2013.01); *H01Q 1/36* (2013.01); *H04B 1/08* (2013.01)

(58) Field of Classification Search
CPC .............. H04R 1/1008; H04R 2420/07; H04R 1/1058; H01Q 1/24; H01Q 1/36; H01Q 9/28; H01Q 1/273; H04B 1/08
See application file for complete search history.

(56) References Cited

U.S. PATENT DOCUMENTS 8,570,444 B2 * 10/2013 Nonomura ............... H04N 5/64
348/715
9,130,651 B2 * 9/2015 Tabe ...................... H01Q 1/245
(Continued)

FOREIGN PATENT DOCUMENTS

CN 104009511 A 8/2014
CN 104349237 A 2/2015
(Continued)

OTHER PUBLICATIONS

International Search Report and Written Opinion of PCT Application No. PCT/JP2018/041367, dated Jan. 22, 2019, 09 pages of ISRWO.

*Primary Examiner* — Jean B Jeanglaude
(74) *Attorney, Agent, or Firm* — Chip Law Group

(57) ABSTRACT

To reduce the effect on the communication performance of an antenna to secure a good communication state with respect to the antenna. An acoustic output device includes a speaker for outputting sound, a cell having one surface facing in a facing direction represented by a predetermined direction,
a control board for controlling predetermined parts, and an antenna for sending and receiving signals, the antenna having at least a portion spaced from the control board and the cell. The cell and the control board are positioned side by side with each other in directions different from thicknesswise directions of the control board. The facing direction is different from the directions in which the cell and the control board are side by side with each other. The antenna is
(Continued)

positioned side by side with at least one of the control board or the cell in the thicknesswise directions or the facing direction.

17 Claims, 16 Drawing Sheets

(51) Int. Cl.
*H01Q 1/36* (2006.01)
*H04B 1/08* (2006.01)

(56) References Cited

U.S. PATENT DOCUMENTS

| | | | |
|---|---|---|---|
| 9,237,211 B2* | 1/2016 | Tabe | H04W 52/04 |
| 9,438,846 B2* | 9/2016 | Hirashima | H01R 12/724 |
| 9,729,979 B2 | 8/2017 | Ozden | |
| 11,024,938 B2* | 6/2021 | Moon | H01Q 1/2208 |
| 11,114,741 B2* | 9/2021 | Moon | H01Q 21/062 |
| 2012/0032876 A1* | 2/2012 | Tabe | H01Q 1/245 |
| | | | 455/571 |
| 2012/0087506 A1 | 4/2012 | Ozden | |
| 2013/0083249 A1* | 4/2013 | Nonomura | H04N 5/64 |
| | | | 348/725 |
| 2013/0169891 A1* | 7/2013 | Hirashima | H01R 12/724 |
| | | | 348/836 |
| 2014/0022749 A1* | 1/2014 | Nonomura | H04N 5/64 |
| | | | 361/752 |
| 2014/0241557 A1 | 8/2014 | Martius et al. | |
| 2015/0043763 A1 | 2/2015 | Troelsen et al. | |
| 2015/0334494 A1 | 11/2015 | Martius et al. | |
| 2016/0269836 A1 | 9/2016 | Martius et al. | |
| 2016/0373867 A1 | 12/2016 | Ozden | |
| 2017/0245068 A1 | 8/2017 | Troelsen et al. | |
| 2017/0303056 A1 | 10/2017 | Ozden | |
| 2018/0007478 A1 | 1/2018 | Nikles et al. | |
| 2018/0146305 A1 | 5/2018 | Ozden | |
| 2018/0213338 A1 | 7/2018 | Troelsen et al. | |

FOREIGN PATENT DOCUMENTS

| | | |
|---|---|---|
| CN | 102570000 B | 8/2015 |
| CN | 107810644 A | 3/2018 |
| CN | 107889554 A | 4/2018 |
| DE | 102013202930 A1 | 9/2014 |
| EP | 2458674 A2 | 5/2012 |
| EP | 2725655 A1 | 4/2014 |
| EP | 2770753 A1 | 8/2014 |
| EP | 2835863 A1 | 2/2015 |
| EP | 3110170 A1 | 12/2016 |
| EP | 2770753 A1 | 8/2017 |
| EP | 3324651 A1 | 5/2018 |
| JP | 5442692 B2 | 3/2014 |
| JP | 2014-090467 A | 5/2014 |
| JP | 5683681 B2 | 3/2015 |
| JP | 2015-144337 A | 8/2015 |
| JP | 2016-086281 A | 5/2016 |
| JP | 2017-147566 A | 8/2017 |
| JP | 2018-515954 A | 6/2018 |
| JP | 2018-519739 A | 7/2018 |
| WO | 2016/146487 A1 | 9/2016 |
| WO | 2016/207215 A1 | 12/2016 |

* cited by examiner

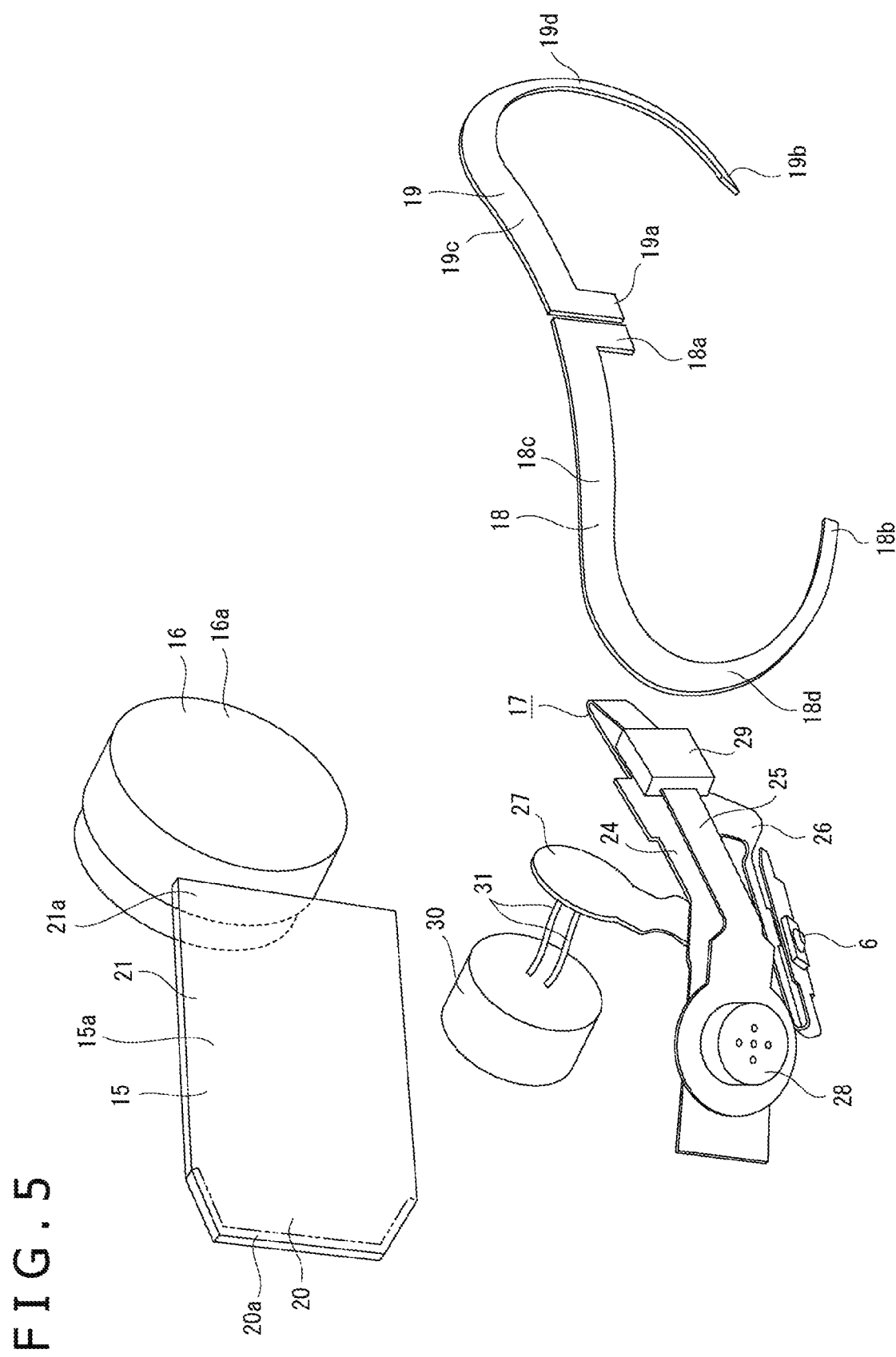
F I G. 5

ACOUSTIC OUTPUT DEVICE

CROSS REFERENCE TO RELATED APPLICATIONS

This application is a U.S. National Phase of International Patent Application No. PCT/JP2018/041367 filed on Nov. 7, 2018, which claims priority benefit of Japanese Patent Application No. JP 2017-255175 filed in the Japan Patent Office on Dec. 29, 2017 and also claims priority benefit of Japanese Patent Application No. JP 2018-186760 filed in the Japan Patent Office on Oct. 1, 2018. Each of the above-referenced applications is hereby incorporated herein by reference in its entirety.

TECHNICAL FIELD

The present technology relates to the technical field of an acoustic output device including a speaker that outputs sound and an antenna that sends and receives signals.

BACKGROUND ART

There are acoustic output devices used as headphones or earphones mounted on heads to output sound from speakers. In recent years, the acoustic output devices have been used increasingly in an outdoor mode as well as an indoor mode.

Some acoustic output devices have an antenna that sends and receives signals and a cell as an electric power source for supplying electric power to various parts, other than a speaker for outputting sound and a control board for controlling operation of the speaker, etc. (see, for example, PTL 1, paragraph 0067, etc.).

An acoustic output device with an antenna is able to send signals to and receive signals from a communication device such as a portable device via wireless communication or the like. For example, the acoustic output device can receive music data, i.e., a sound signal, sent from the communication device and output the received music data as sound from a speaker. Acoustic output devices of the type used as a pair of left and right ones are capable of sending a signal received by one of the antennas from the one of the antennas to the other antenna, so that they can output sound in a stereo mode.

CITATION LIST

Patent Literature

[PTL 1]
  JP2016-86281A

SUMMARY

Technical Problems

Incidentally, in the acoustic output devices that have the antenna, the control board, and the cell as described above, if operation noise is generated by the control board, then the operation noise affects the antenna and causes the control board and the antenna to be coupled to each other at high frequencies, tending to lower RF (Radio Frequency) performance and fail to secure good communication performance.

Furthermore, depending on the positions and distances of metal bodies including electronic parts, the cell, etc. mounted on the control board with respect to the antenna, the performance of the antenna tends to be lowered, still failing to secure good communication performance of the antenna.

Particularly, if the control board and the antenna is liable to be coupled at high frequencies, then electric power, i.e., radio waves, radiated toward the human body increases, resulting in an increased loss of the radiation efficiency that represents the ratio of electric power radiated as radio waves into the air to electric power input to the antenna.

Accordingly, an acoustic output device according to the present technology is aimed at overcoming the above problems and reducing the effect on the communication performance of an antenna to secure a good communication state with respect to the antenna.

Solution to Problems

First, an acoustic output device according to the present technology includes a speaker for outputting sound, a cell having one surface facing in a facing direction represented by a predetermined direction, a control board for controlling predetermined parts, and an antenna for sending and receiving signals, the antenna having at least a portion spaced from the control board and the cell. The cell and the control board are positioned side by side with each other in directions different from thicknesswise directions of the control board. The facing direction is different from the directions in which the cell and the control board are side by side with each other. The antenna is positioned side by side with at least one of the control board or the cell in the thicknesswise directions or the facing direction.

With this arrangement, the antenna has at least a portion positioned in spaced relation to the control board and the cell that are positioned side by side with each other in the directions different from the thicknesswise directions, and the antenna is positioned side by side with the control board in the thicknesswise direction or side by side with the cell in the facing direction.

Secondly, in the acoustic output device described above, it is desirable that the antenna be positioned side by side with the control board in the thicknesswise directions.

With this arrangement, the cell and the control board are positioned side by side with each other in the directions different from the thicknesswise directions of the control board, and the antenna is positioned side by side with the control board in the thicknesswise directions of the control board.

Thirdly, in the acoustic output device described above, it is desirable that the antenna be positioned along an outer peripheral region of the control board.

With this arrangement, the cell and the control board are positioned side by side with each other in the directions different from the thicknesswise directions of the control board, and the antenna is positioned along the outer peripheral region of the control board in the thicknesswise directions of the control board.

Fourthly, in the acoustic output device described above, it is desirable that the acoustic output device further include a case body in which the speaker, the control board, the cell, and the antenna are disposed, the case body have an end portion provided as a curved surface portion that is protruding outwardly, on a side of the case body where the control board is disposed in the directions in which the control board and the cell are side by side with each other, and the antenna have a portion positioned along an inner surface of the curved surface portion.

With this arrangement, since the portion of the antenna is positioned along the inner surface of the curved surface portion that is protruding outwardly, it is possible to increase the distance of the antenna from the control board.

Fifthly, in the acoustic output device described above, it is desirable that a control circuit having a circuit pattern be formed on the control board, and the control board include a non-formed region free of the control circuit and electronic parts, in at least part of an outer peripheral portion thereof.

With this arrangement, at least a portion of the antenna is positioned along the non-formed region.

Sixthly, in the acoustic output device described above, it is desirable that the antenna be positioned side by side with the cell in the facing direction.

With this arrangement, the control board and the cell are positioned side by side with each other in the directions different from the thicknesswise directions of the control board, and the antenna is positioned side by side with the cell in the facing direction.

Seventhly, in the acoustic output device described above, it is desirable that the antenna be positioned along an outer peripheral region of the cell.

With this arrangement, the control board and the cell are positioned side by side with each other in the directions different from the thicknesswise directions of the control board, and the antenna is positioned along the outer peripheral region of the cell in the facing direction.

Eighthly, in the acoustic output device described above, it is desirable that the acoustic output device further include a case body in which the speaker, the control board, the cell, and the antenna are disposed, the case body have an end portion provided as a curved surface portion that is protruding outwardly, on a side of the case body where the cell is disposed in the directions in which the control board and the cell are side by side with each other, and the antenna have a portion positioned along an inner surface of the curved surface portion.

With this arrangement, since the portion of the antenna is positioned along the inner surface of the curved surface portion that is protruding outwardly, it is possible to increase the distance of the antenna from the cell.

Ninthly, in the acoustic output device described above, it is desirable that the antenna include two antennas, one of the antennas be positioned side by side with the control board in the thickness directions, and the other of the antennas be positioned side by side with the cell in the facing direction.

With this arrangement, the cell and the control board are positioned side by side with each other in the directions different from the thicknesswise directions of the control board, and the two antennas are positioned side by side with the control board and the cell, respectively, in the thicknesswise directions of the control board and the facing direction of the cell.

Tenthly, in the acoustic output device described above, it is desirable that the one of the antennas be positioned along an outer peripheral region of the control board, and the other of the antennas be positioned along an outer peripheral region of the cell.

With this arrangement, the cell and the control board are positioned side by side with each other in the directions different from the thicknesswise directions of the control board, and the two antennas are positioned along the outer peripheral region of the control board and the outer peripheral region of the cell, respectively, in the thicknesswise directions of the control board and the facing direction of the cell.

Eleventhly, in the acoustic output device described above, it is desirable that the acoustic output device further include a case body in which the speaker, the control board, the cell, and the antenna are disposed, the case body have both end portions provided as curved surface portions that are protruding outwardly, in the directions in which the control board and the cell are side by side with each other, and the two antennas have respective portions positioned along inner surfaces of the curved surface portions.

With this arrangement, inasmuch as the respective portions of the two antennas are positioned along the inner surfaces of the curved surface portions that are protruding outwardly, it is possible to increase the distances of the two antennas respectively from the control board and the cell.

Twelfthly, in the acoustic output device described above, it is desirable that the two antennas be formed in symmetrical shapes and disposed in symmetrical positions.

With this arrangement, the antennas that are formed in symmetrical shapes are disposed in symmetrical positions and their communication states are stabilized.

Thirteenthly, in the acoustic output device described above, it is desirable that the antenna have an end portion connected to the control board, and the antenna have a portion other than the end portion, positioned in spaced relation to the control board or the cell.

With this arrangement, the portion of the antenna other than the end portion is held out of contact with the control board.

Fourteenthly, in the acoustic output device described above, it is desirable that the speaker and the cell be positioned side by side with each other in directions substantially perpendicular to the directions in which the control board and the cell are side by side with each other.

With this arrangement, as the directions in which the control board and the cell are side by side with each other are substantially perpendicular to the directions in which the speaker and the cell are side by side with each other, the acoustic output device is not increased in size in one direction.

Fifteenthly, in the acoustic output device described above, it is desirable that the speaker and the antenna be positioned on opposite sides of the cell in sandwiching relation thereto.

With this arrangement, the effect imposed by the speaker on communication through the antenna is reduced.

Sixteenthly, in the acoustic output device described above, it is desirable that the acoustic output device be positioned in its entirety inwardly of an outer peripheral region of an ear while the acoustic output device is mounted on the ear.

With this arrangement, the entire acoustic output device mounted on the ear does not protrude outwardly from the outer periphery of the ear.

Seventeenthly, in the acoustic output device described above, it is desirable that the acoustic output device further include a mounting assistance member configured to engage an inner peripheral edge of an upper limb of antihelix of the ear while the acoustic output device is mounted on the ear.

With this arrangement, the acoustic output device is mounted on the ear while the mounting assistance member engages the inner peripheral edge of the upper limb of antihelix.

Advantageous Effects of Invention

According to the present technology, since the antenna has at least a portion positioned in spaced relation to the control board and the cell that are positioned side by side with each other in the directions different from the thicknesswise directions, and the antenna is positioned side by side with the control board in the thicknesswise direction or side by side with the cell in the facing direction, the effect imposed on communication through the antenna is reduced, making it possible to secure a good communication state with respect to the antenna.

Incidentally, the advantages described in the present description are by way of example only and not restrictive, and should not preclude other advantages.

BRIEF DESCRIPTION OF DRAWINGS

FIG. 5 is an exploded perspective view of the acoustic output device.

DESCRIPTION OF EMBODIMENTS

Embodiments of acoustic output devices according to the present technology will hereinafter be described with reference to the accompanying drawings.

The embodiments illustrated below deal with an acoustic output device according to the present technology as applied to an earphone. However, the application of the present technology is not limited to an earphone, but the present technology is widely applicable to other various acoustic output devices such as headphones, etc.

Structure of Ear

Figure 1:
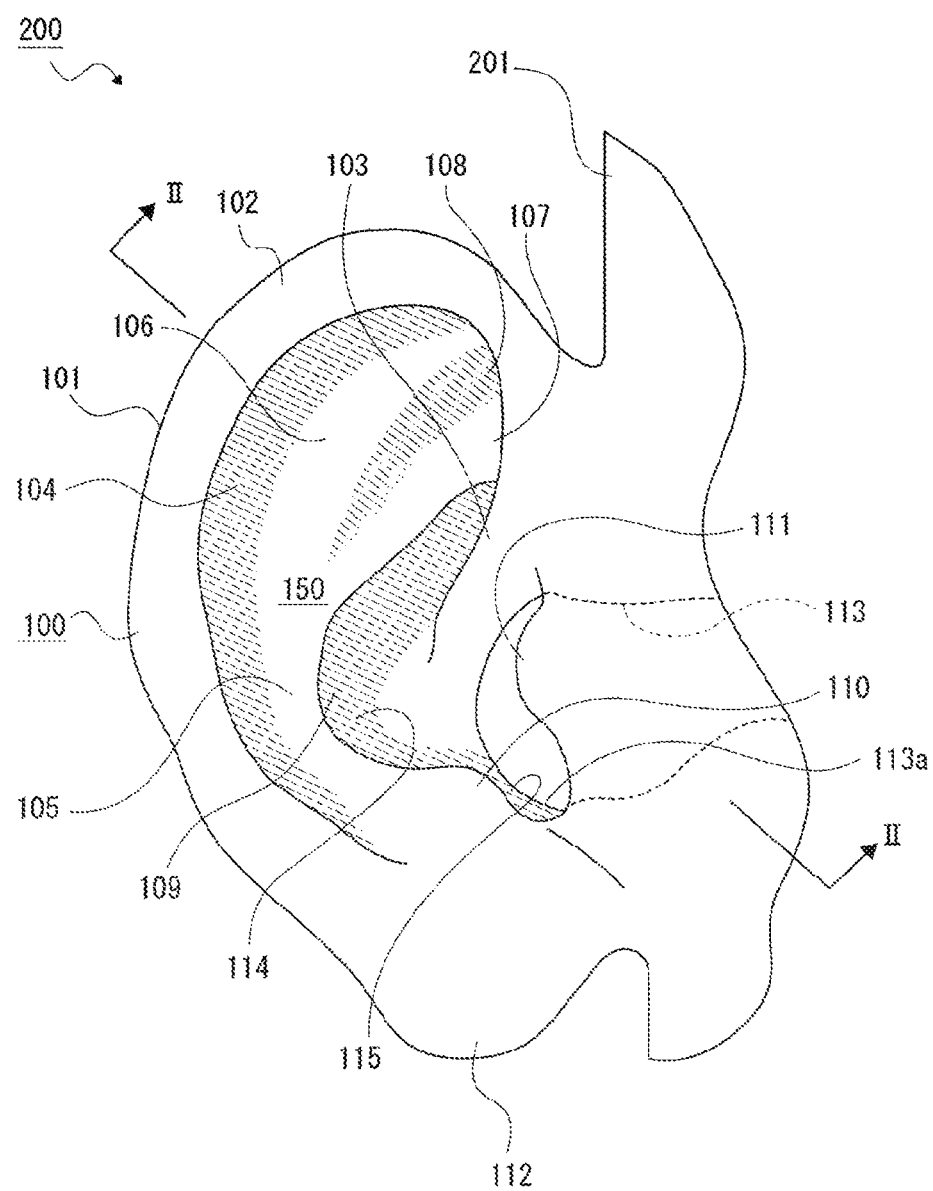
FIG. 1, together with FIGS. 2 through 17, illustrates an embodiment of an acoustic output device according to the present technology, the present figure being a perspective view of an ear for mounting the acoustic output device thereon.
Figure 2:
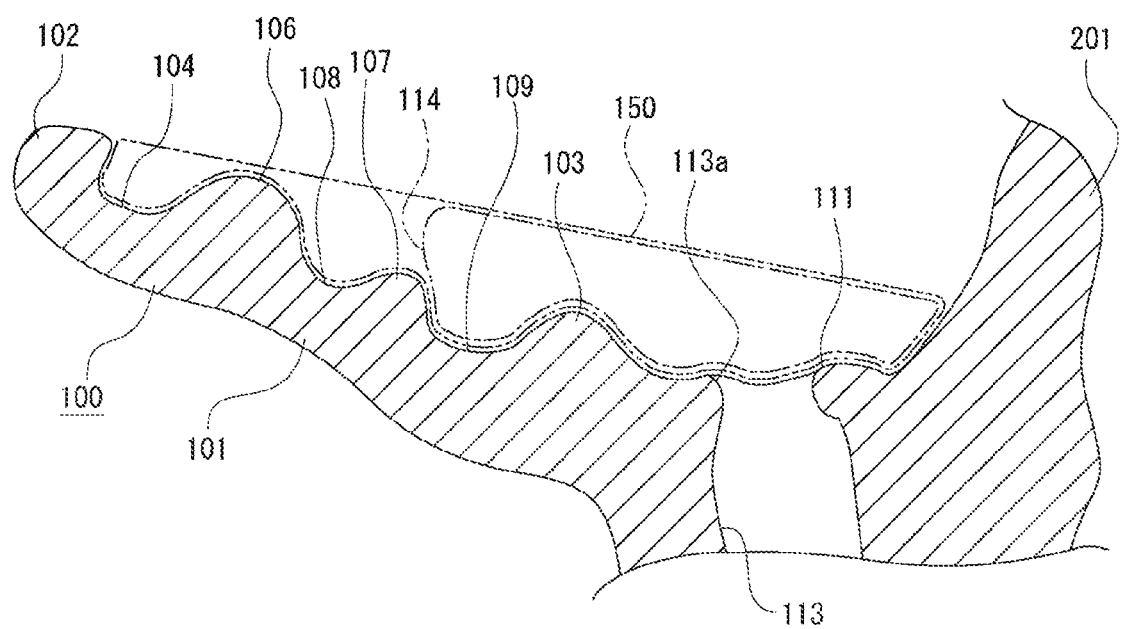
FIG. 2 is a cross-sectional view taken along line II-II of FIG. 1.

First, the structure of an ear for mounting the acoustic output device thereon will be described below (see FIGS. 1 and 2).

Ears 100, 100 are part of a head 200 and include respective auricles 101, 101 and parts such as eardrums, semicircular canals, cochleae, etc. that are present within the head 200. Of the head 200, portions on the inner sides of the auricles 101, 101 are respective temporal regions 201, 201, and the auricles 101, 101 protrude leftwardly and rightwardly from the respective temporal regions 201, 201.

The auricle 101 is of a shallow recessed shape that is open substantially forwardly as a whole so as to have an inner space 150 therein. The auricle 101 has an outer peripheral region that has a portion referred to as a helix 102 and a portion referred to as a limb 103 of helix contiguous to the helix 102 and positioned near the temporal region 201.

A portion on the inner side of the helix 102 is referred to as a recessed scapha 104, and a portion that is substantially lower one-half of an inner side of the scapha 104 is referred to as a protruding antihelix 105. A bifurcated protruding portion exists upwardly of the antihelix 105 and contiguous to the antihelix 105. Of the bifurcated protruding portion, an inside region and an outside region are referred to as an upper limb 106 of antihelix and a lower limb 107 of antihelix, respectively. A portion between the upper limb 106 of antihelix and the lower limb 107 of antihelix is referred to as a recessed triangular fossa 108, and a portion on the inner side of the antihelix 105 and the lower limb 107 of antihelix is referred to as a recessed cymba conchae 109.

A portion that is downwardly contiguous to the antihelix 105 is a portion slightly bulging toward the temporal region 201 and referred to as an antitragus 110. A portion disposed on a temporal region 201 side in facing relation to the antitragus 110 is referred to as a tragus 111 slightly bulging toward the antitragus 110, and a lower end portion contiguous to a lower side of the helix 102 is referred to as an ear lobe 112.

An external acoustic foramen 113a as the entrance of an external acoustic meatus 113 exists in a portion between the antitragus 110 and the tragus 111. The external acoustic meatus 113 communicates with the eardrum, the semicircular canal, etc. Of the inner space 150 of the auricle 101, a space surrounded by the antihelix 105, the lower limb 107 of antihelix, and the limb 103 of helix, i.e., a space in front of the cymba conchae 109, is referred to as a cavity 114 of concha that communicates with the external acoustic foramen 113a of the external acoustic meatus 113. Of the inner space 150, a space that is contiguous downwardly to a lower side of cavity 114 of concha and is open in a U shape is a space referred to as an intertragic notch 115.

The inner space 150 of the auricle 101 includes the cavity 114 of concha, the intertragic notch 115, and a space in the vicinity of the external acoustic foramen 113a of the external acoustic meatus 113, and is a space including the scapha 104, the antihelix 105, the upper limb 106 of antihelix, the lower limb 107 of antihelix, the triangular fossa 108, the antitragus 110, and a space in front of the tragus 111.

Configuration of Acoustic Output Device

Next, the configuration of acoustic output devices 1, 1 (see FIGS. 3 through 8) will be described. One of the acoustic output devices 1, 1 is used on a left ear 100 and the other on a right ear 100. However, either one of the acoustic output devices 1 may be used to hear sound.

Figure 3:
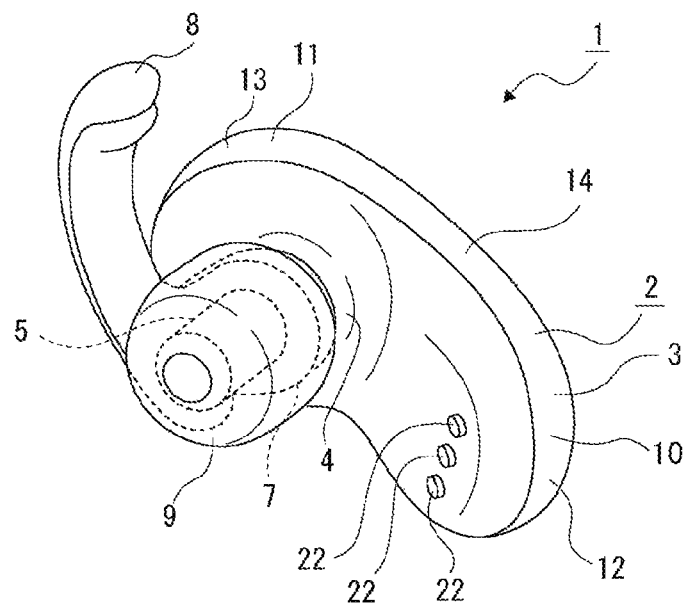
FIG. 3 is a perspective view of the acoustic output device.
Figure 4:
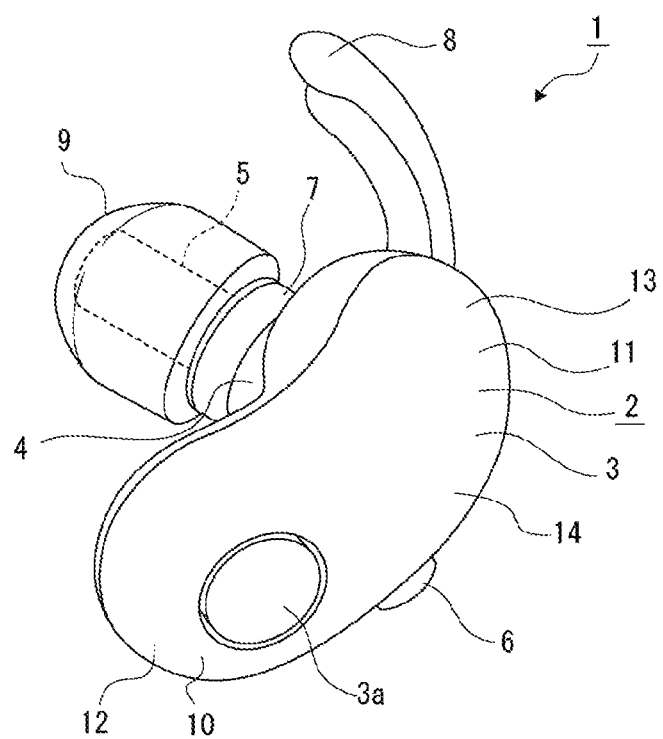
FIG. 4 is a perspective view of the acoustic output device as viewed from a direction different from FIG. 3.

The acoustic output device 1 has a case body 2 provided as an outer casing and required parts disposed in the case body 2 (see FIGS. 3 and 4).

The case body 2 has a main body portion 3, a protrusive portion 4, and a pad mounting portion 5.

The main body portion 3 is gradually curved along a direction defined as a longitudinal direction, and has an outer surface that is of an outwardly protruding shape in its entirety.

The main body portion 3 has placement holes defined therein in an array along a direction perpendicular to the longitudinal direction at a position near one end in the longitudinal direction. The main body portion 3 includes a sound input portion 3a on a side opposite the placement holes. An operating member 6 such as a power button is disposed in a substantially central portion of the main body portion 3 in the longitudinal direction.

The protrusive portion 4 protrudes from a region near one end in the longitudinal direction of the main body portion 3 toward a side opposite the side where the sound input portion 3a is positioned, and is formed in a substantially hollow cylindrical shape that protrudes in a direction perpendicular to the longitudinal direction of the main body portion 3.

A coupling ring 7 is mounted on the protrusive portion 4 at a position on a distal end side thereof, and a mounting assistance member 8 protrudes from the coupling ring 7. The mounting assistance member 8 has at least a portion including a pliable material such as silicone, for example. The mounting assistance member 8 is formed in a substantially arcuate shape and is curved so as to be progressively spaced away from the coupling ring 7 toward its distal end.

The pad mounting portion 5 protrudes from the distal end of the protrusive portion 4 in the same direction as the direction in which the protrusive portion 4 protrudes from the main body portion 3. The pad mounting portion 5 is of a substantially hollow cylindrical shape whose diameter is significantly smaller than the protrusive portion 4, and has an inner space formed as a sound guiding space. An earphone pad 9 is mounted on the pad mounting portion 5. The earphone pad 9 includes a pliable material such as urethane, for example, and is detachably mounted on the pad mounting portion 5.

Figure 6:
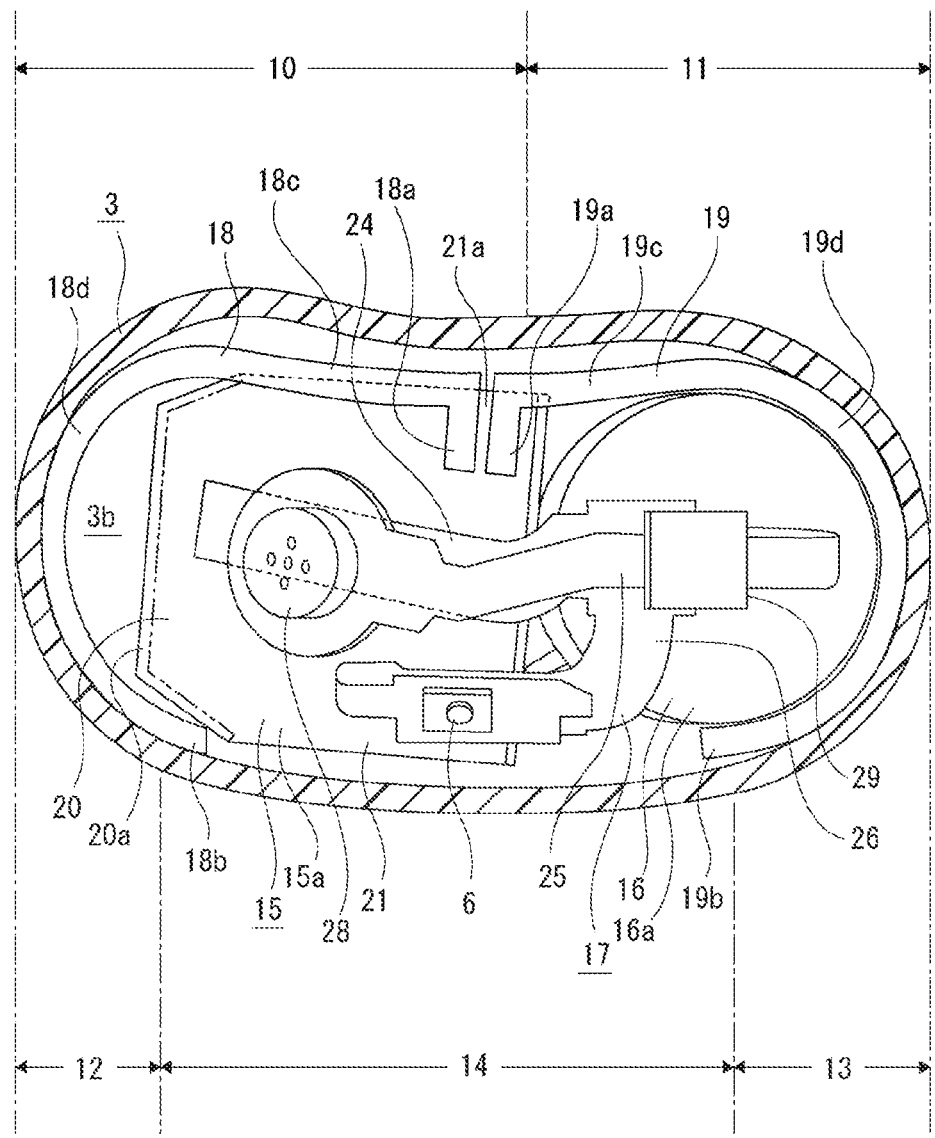
FIG. 6 is a side elevational view illustrating an internal structure of the acoustic output device with a case body in cross section.
Figure 7:
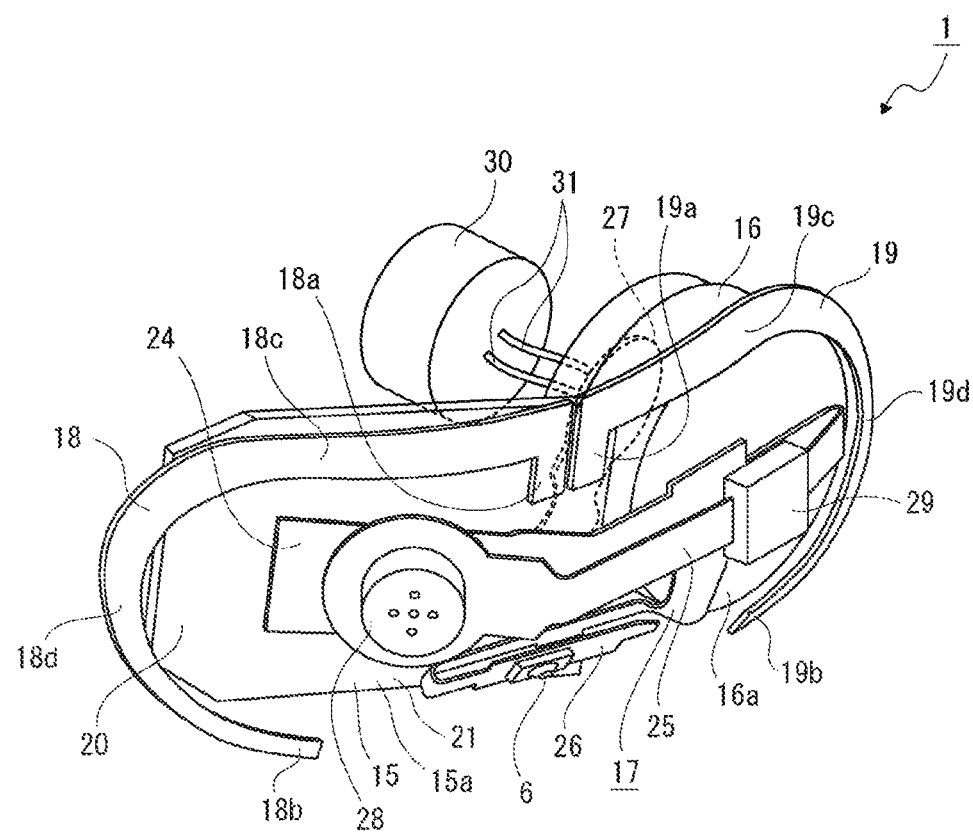
FIG. 7 is a perspective view illustrating the internal structure of the acoustic output device.
Figure 8:
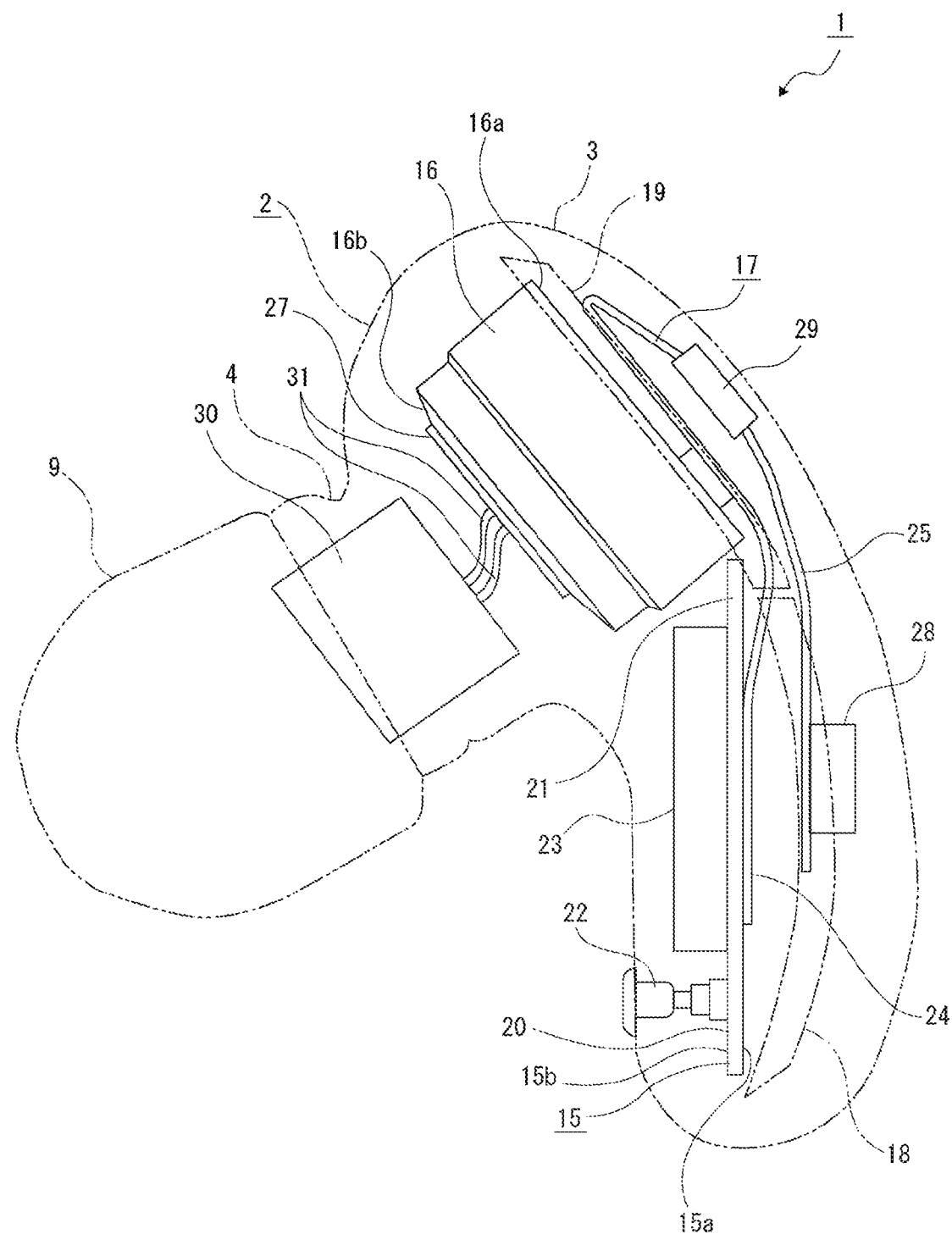
FIG. 8 is a plan view illustrating the internal structure of the acoustic output device.

The main body portion 3 has an inner space formed as a placement space 3b (see FIG. 6). Substantially one half of the main body portion 3 in the longitudinal direction thereof where the protrusive portion 4 is not present serves as a first placement portion 10, whereas substantially one half of the main body portion 3 in the longitudinal direction thereof where the protrusive portion 4 is present serves as a second placement portion 11 (see FIGS. 3, 4, and 6). The first placement portion 10 has an end portion opposite the second placement portion 11, serving as a first curved surface portion 12 formed in a curved surface shape, the first curved surface portion 12 being of an outwardly protruding cup shape or substantially semispherical shape. The second placement portion 11 has an end portion opposite the first placement portion 10, serving as a second curved surface portion 13 formed in a curved surface shape, the second curved surface portion 13 being of an outwardly protruding cup shape or substantially semispherical shape. The main body portion 3 has a portion between the first curved surface portion 12 and the second curved surface portion 13, serving as a tubular portion 14 having an outer circumferential surface as a curved surface.

A control board 15, a cell 16, a wiring board 17, and antennas 18, 19 are disposed in the placement space 3b of the main body portion 3 (see FIGS. 5 through 8).

The control board 15 has a function to control predetermined parts such as a speaker, a microphone, etc., to be described later, with electric power supplied from the cell 16. The cell 16 is provided as a battery, for example, and has a function to supply electric power to the parts such as the control board 15, etc. The wiring board 17 has a function to send and receive electric power and signals between the parts such as the control board 15, the cell 16, etc. The antennas 18 and 19 have a function to send and receive signals between the acoustic output device and a communication device such as a portable device via wireless communication or the like.

Incidentally, a proximity wireless communication standard such as Bluetooth (trademark) or Wi-Fi (trademark) (Wireless Fidelity) may be used as a communication standard between the communication device and the antennas 18 and 19.

In the configuration where the acoustic output devices 1, 1 are used on the left ear and the right ear, communication is performed between the communication device and the antennas 18 and 19 of one of the acoustic output devices 1 and also between the antennas 18 and 19 of one of the acoustic output devices 1 and the antennas 18 and 19 of the other acoustic output device 1.

In the acoustic output device 1, music data, i.e., a sound signal, sent from the communication device is received by the antennas 18 and 19 and the received music data are output as sound from the speaker. Furthermore, in the acoustic output devices 1, 1 used on the left ear and the right ear, signals received by the antennas 18 and 19 of one of the acoustic output devices 1 are sent to the antennas 18 and 19 of the other acoustic output device 1, so that the acoustic output devices 1 are capable of outputting sound in a stereo mode.

The control board 15 has a first surface 15a and a second surface 15b as both surfaces that are opposite each other in thicknesswise directions thereof. A control circuit having a circuit pattern, not illustrated, and a plurality of electronic parts, not illustrated, are mounted on at least one of the first surface 15a or the second surface 15b.

The control board 15 is disposed in the first placement portion 10 of the main body portion 3 with its thicknesswise directions inclined to the direction in which the protrusive portion 4 protrudes from the main body portion 3. The control board 15 has an end portion positioned on the first curved surface portion 12 side as a narrow portion 20 whose width is smaller than the other portion thereof, and has the portion other than the narrow portion 20 as a wide portion 21. The narrow portion 20 is shaped as a substantially isosceles trapezoid that is progressively wider toward the wide portion 21.

The narrow portion 20 of the control board 15 has an outer peripheral portion provided as a non-formed region 20a, indicated by dot-and-dash lines in FIG. 6, where no control circuit is formed and no electronic parts are mounted. The wide portion 21 of the control board 15 has an end portion opposite the narrow portion 20, provided as an antenna connection portion 21a.

Charging terminals 22, 22, 22 are connected to the second surface 12b of the control board 15. The charging terminals 22, 22, 22 are disposed in the placement space 3b and have respective distal end portions inserted in the placement holes in the case body 2.

The charging terminals 22, 22, 22 are connected to electrode terminals of a charging device, not illustrated, while the acoustic output device 1 is mounted on the charging device. Therefore, the cell 16 is charged with electric power that is input from the charging device to the charging terminals 22, 22, 22.

A shield case 23 is attached to a portion of the control board 15 except for a region thereof. The shield case 23 restrains unwanted radiation of electromagnetic waves caused from the control board 15.

The cell 16 is of a substantially cylindrical shape of reduced thickness. A button-type cell, for example, is used as the cell 16. The cell 16 has a positive pole and a negative pole formed respectively on one surface 16a and another surface 16b thereof that are positioned opposite each other. The cell 16 has axial directions, i.e., thicknesswise directions, joining the one surface 16a and the other surface 16b. The direction in which the one surface 16a of the cell 16 faces is defined as a facing direction that is aligned with the axial directions, i.e., thicknesswise directions, of the cell 16.

The cell 16 has its axial directions substantially aligned with the axial directions of the protrusive portion 4, and is disposed in the second placement portion 11 such that the axial directions of the cell 16 are slightly inclined to the thicknesswise directions of the control board 15. Specifically, the cell 16 that is disposed in the second placement portion 11 has its axial directions slightly inclined to the thicknesswise directions of the control board 15 so as to have the other surface 16b closer to the second surface 15b of the control board 15.

The wiring board 17 has a first extension portion 24, a second extension portion 25, a leading portion 26, and a branched portion 27.

The first extension portion 24 is disposed in a state extending in directions in which the control board 15 and the cell 16 are side by side with each other. The first extension portion 24 has portions connected respectively to the first surface 15a of the control board 15 and the one surface 16a of the cell 16.

The second extension portion 25 is disposed in a state extending in the directions in which the control board 15 and the cell 16 are side by side with each other. The second extension portion 25 is folded back over itself from the end of the first extension portion 24 on the cell 16 side, and is disposed in facing relation to the first extension portion 24. A microphone 28 is connected to an end of the second extension portion 25 in a longitudinal direction thereof. The microphone 28 is positioned in facing relation to the sound input portion 3a of the case body 2. A sticking member 29 is coupled to a portion of the second extension portion 25 on the cell 16 side, and is stuck to an inner surface of the case body 2.

The leading portion 26 leads from a portion of the first extension portion 24 on the cell 16 side and is folded back over itself except a region thereof. The operating member 6 is connected to a distal end portion of the leading portion 26.

The branched portion 27 is branched from an intermediate portion of the leading portion 26 and disposed around the cell 16. The branched portion 27 has a distal end portion connected to the other surface 16b of the cell 16.

The antennas 18 and 19 are formed in a symmetrical shape or a substantially symmetrical shape, and have respective end portions 18a and 19a connected to an antenna connection portion 21a of the control board 15.

The antenna 18 has a straight portion 18c and an arcuate portion 18d other than the end portion 18a and another end portion 18b. The straight portion 18c is contiguous to the end portion 18a and extends in the same directions as the longitudinal directions of the main body portion 3. The arcuate portion 18d is contiguous to the other end portion 18b, and the straight portion 18c and the arcuate portion 18d are contiguous to each other.

The antenna 18 is positioned side by side with the control board 15 in the thicknesswise directions of the control board 15, and is positioned along an outer peripheral region of the control board 15. The antenna 18 has a portion other than the one end portion 18a, disposed in spaced relation to the control board 15 and held in contact with or closely to an outer circumferential portion of the inner surface of the case body 2.

The antenna 18 is disposed along the inner surface of the case body 2, and the arcuate portion 18d is positioned in contact with or closely to an outer circumferential portion of an inner surface of the first curved surface portion 12 of the case body 2.

As described above, in the acoustic output device 1, the antenna 18 is positioned side by side with the control board 15 in the thicknesswise directions of the control board 15.

Therefore, since the cell 16 and the control board 15 are positioned side by side with each other in directions different from the thicknesswise directions of the control board 15 and the antenna 18 is positioned side by side with the control board 15 in the thicknesswise directions of the control board 15, a good communication state with respect to the antenna 18 can be secured and the acoustic output device 1 can be reduced in size.

Furthermore, the antenna 18 is positioned along the outer peripheral portion of the control board 15.

Therefore, as the cell 16 and the control board 15 are positioned side by side with each other in the directions different from the thicknesswise directions of the control board 15 and the antenna 18 is positioned along the outer peripheral portion of the control board 15 in the thicknesswise directions of the control board 15, the effect imposed by the control board 15 on communication through the antenna 18 is reduced, making it possible to secure a better communication state with respect to the antenna 18.

Moreover, because the antenna 18 is disposed without protruding largely outwardly from the outer periphery of the control board 15, the acoustic output device 1 can be reduced in size through effective utilization of space.

Still further, as the antenna 18 is formed in a shape along the outer periphery of the control board 15, it is possible to increase the length of the antenna 18, thereby increasing the communication performance of the antenna 18.

Furthermore, the end of the case body 2 where the control board 15 is disposed in the directions in which the control board 15 and the cell 16 are side by side with each other is provided as the first curved surface portion 12 that is protruding outwardly, and a portion of the antenna 18 is positioned along the inner surface of the first curved surface portion 12.

Consequently, since a portion of the antenna 18 is positioned along the inner surface of the first curved surface portion 12 that is protruding outwardly, the distance of the antenna 18 from the control board 15 can be increased, and the effect imposed by the control board 15 on communication through the antenna 18 is reduced, making it possible to secure a better communication state with respect to the antenna 18 and to reduce the size of the acoustic output device 1 through effective utilization of space.

Moreover, the control board 15 has the non-formed region 20a in at least a portion of the outer periphery thereof where no control circuit is formed and no electronic parts are mounted.

Therefore, since at least a portion of the antenna 18 is positioned along the non-formed region 20a, the effect imposed by the control board 15 on communication through the antenna 18 is further reduced, making it possible to secure a much better communication state with respect to the antenna 18.

The antenna 19 has a straight portion 19c and an arcuate portion 19d other than the end portion 19a and another end portion 19b. The straight portion 19c is contiguous to the end portion 19a and extends in the same directions as the longitudinal directions of the main body portion 3. The arcuate portion 19d is contiguous to the other end portion 19b, and the straight portion 19c and the arcuate portion 19d are contiguous to each other.

The antenna 19 is positioned side by side with the cell 16 in the facing direction in which the one surface 16a faces, and is positioned along an outer peripheral region of the cell 16. The antenna 19 is disposed in spaced relation to the cell 16 and has a portion other than the end portion 19a, held in contact with or closely to an outer circumferential portion of the inner surface of the case body 2.

The antenna 19 is disposed along the inner surface of the case body 2, and the arcuate portion 19d is positioned in contact with or closely to an outer circumferential portion of an inner surface of the second curved surface portion 13 of the case body 2.

As described above, in the acoustic output device 1, the antenna 19 is positioned side by side with the cell 16 in the facing direction of the cell 16.

Therefore, since the control board 15 and the cell 16 are positioned side by side with each other in directions different from the thicknesswise directions of the control board 15 and the antenna 19 is positioned side by side with the cell 16 in the facing direction, a good communication state with respect to the antenna 19 can be secured and the acoustic output device 1 can be reduced in size.

Furthermore, the antenna 19 is positioned along the outer peripheral portion of the cell 16.

Therefore, as the control board 15 and the cell 16 are positioned side by side with each other in the directions different from the thicknesswise directions of the control board 15 and the antenna 19 is positioned along the outer peripheral portion of the cell 16 in the facing direction, the effect imposed by the cell 16 on communication through the antenna 19 is reduced, making it possible to secure a better communication state with respect to the antenna 19.

Moreover, because the antenna 19 is disposed without protruding largely outwardly from the outer periphery of the cell 16, the acoustic output device 1 can be reduced in size through effective utilization of space.

Still further, as the antenna 19 is formed in a shape along the outer periphery of the cell 16, it is possible to increase the length of the antenna 19, thereby increasing the communication performance of the antenna 19.

Furthermore, the end of the case body 2 that is opposite the side where the control board 15 is disposed in the directions in which the control board 15 and the cell 16 are side by side with each other is provided as the second curved surface portion 13 that is protruding outwardly, and a portion of the antenna 19 is positioned along the inner surface of the second curved surface portion 13.

Consequently, since a portion of the antenna 19 is positioned along the inner surface of the second curved surface portion 13 that is protruding outwardly, the distance of the antenna 19 from the cell 16 can be increased, and the effect imposed by the cell 16 on communication through the antenna 19 is reduced, making it possible to secure a better communication state with respect to the antenna 19 and to reduce the size of the acoustic output device 1 through effective utilization of space.

The speaker 30 is disposed within the protrusive portion 4 of the case body 2. The speaker 30 may be a dynamic-type driver unit, for example. The speaker 30 has a substantially cylindrical outer shape, and is disposed within the protrusive portion 4 and has axial directions oriented in substantial alignment with the axial directions of the cell 16. The branched portion 27 of the wiring board 17 has a distal end portion connected to the speaker 30 through connection wires 31.

Mounted State of Acoustic Output Device on Ear

The acoustic output device 1 constructed as described above is mounted on the ear 100 (see FIG. 9). The acoustic output device 1 is mounted on the ear 100 such that the earphone pad 9 is inserted through the external acoustic foramen 113a into the external acoustic meatus 113 and the case body 2 has a portion positioned in the cavity 114 of concha and pressed against the antihelix 105 and the cymba conchae 109. At this time, the mounting assistance member 8 is inserted into the triangular fossa 108 between the upper limb 106 of antihelix and the lower limb 107 of antihelix and engages an inner peripheral edge of the upper limb 106 of antihelix.

The acoustic output device 1 that has been mounted on the ear 100 is positioned in its entirety inwardly of the outer periphery of the ear 100.

Since the acoustic output device 1 that has been mounted on the ear 100 is positioned in its entirety inwardly of the outer periphery of the ear 100, the entire acoustic output device 1 mounted on the ear 100 does not protrude outwardly from the outer periphery of the ear 100, and is less likely to be touched by a hand or finger and to drop off from the ear 100 and remains stably mounted on the ear 100.

Furthermore, the acoustic output device 1 includes the mounting assistance member 8 that engages the inner peripheral edge of the upper limb 106 of antihelix while the acoustic output device 1 is mounted on the ear 100.

Accordingly, since the acoustic output device 1 is mounted on the ear 100 while the mounting assistance member 8 engages the inner peripheral edge of the upper limb 106 of antihelix, the acoustic output device 1 is much less liable to drop off from the ear 100 and remains more stably mounted on the ear 100.

Summary

As described above, in the acoustic output device 1, the antennas 18 and 19 have at least portions positioned in spaced relation to the control board 15 and the cell 16, the cell 16 and the control board 15 are positioned side by side with each other in the directions different from the thicknesswise directions of the control board 15, the one surface 16a of the cell 16 faces in the direction different from the directions in which the cell 16 and the control board 15 are side by side with each other, and the antennas 18 and 19 are positioned side by side with the control board 15 and the cell 16, respectively in the thicknesswise directions of the control board 15 and the facing direction of the cell 16.

Therefore, since at least the portions of the antennas 18 and 19 are positioned in spaced relation to the control board 15 and the cell 16 that are positioned side by side with each other in the directions different from the thicknesswise directions of the control board 15, and the antennas 18 and 19 are positioned side by side with the control board 15 in the thicknesswise directions of the control board 15 or side by side with the cell 16 in the facing direction, the effect imposed on the communication performance of the antennas 18 and 19 is reduced, making it possible to secure a good communication state with respect to the antennas 18 and 19.

Furthermore, the antenna 18 is positioned side by side with the control board 15 in the thicknesswise directions of the control board 15, and the antenna 19 is positioned side by side with the cell 16 in the facing direction of the cell 16.

Therefore, since the cell 16 and the control board 15 are positioned side by side with each other in the directions different from the thicknesswise directions of the control board 15, and the two antennas 18 and 19 are positioned side by side with the control board 15 and the cell 16, respectively, in the thicknesswise directions of the control board 15 and the facing direction of the cell 16, a better communication state with respect to the antennas 18 and 19 is secured and the size of the acoustic output device 1 is reduced.

Moreover, the antenna 18 is positioned along the outer peripheral region of the control board 15 and the antenna 19 is positioned along the outer peripheral region of the cell 16.

Consequently, since the cell 16 and the control board 15 are positioned side by side with each other in the directions different from the thicknesswise directions of the control board 15, and the two antennas 18 and 19 are positioned along the outer peripheral region of the control board 15 and the outer peripheral region of the cell 16, respectively, in the thicknesswise directions of the control board 15 and the facing direction of the cell 16, it is possible to secure a better communication state with respect to the antennas 18 and 19.

Still further, inasmuch as the antennas 18 and 19 are disposed without protruding largely outwardly from the outer periphery of the control board 15 and the outer periphery of the cell 16, the acoustic output device 1 can be reduced in size through effective utilization of space.

Moreover, as the antennas 18 and 19 are formed in shapes along the respective outer peripheries of the control board 15 and the cell 16, it is possible to increase the lengths of the antennas 18 and 19, thereby increasing the communication performance of the antennas 18 and 19.

Furthermore, both ends of the case body 2 in the directions in which the control board 15 and the cell 16 are side by side with each other are provided respectively as the first curved surface portion 12 and the second curved surface portion 13 that are protruding outwardly, and antennas 18 and 19 have respective portions positioned along the inner surfaces of the first curved surface portion 12 and the second curved surface portion 13.

Therefore, inasmuch as the respective portions of the antennas 18 and 19 are positioned along the inner surfaces of the first curved surface portion 12 and the second curved surface portion 13 that are protruding outwardly, the distances of the antennas 18 and 19 from the control board 15 and the cell 16 can be increased, and the effect imposed by the control board 15 and the cell 16 on communication through the antennas 18 and 19 is reduced, making it possible to secure a better communication state with respect to the antennas 18 and 19 and to further reduce the size of the acoustic output device 1 through effective utilization of space.

Still further, as the antennas 18 and 19 are formed in symmetrical shapes and disposed in symmetrical positions, the antennas 18 and 19 that are formed in the symmetrical shapes are disposed in the symmetrical positions and their communication states are stabilized, making it possible to secure a good communication state of the antennas 18 and 19.

Moreover, the end portions 18a and 19a of the antennas 18 and 19 are connected to the control board 15, and the portions of the antennas 18 and 19 other than the end portions 18a and 19a are positioned in spaced relation to the control board 15 and the cell 16.

Therefore, because the portions of the antennas 18 and 19 other than the end portions 18a and 19a are not held in contact with the control board 15, the effect imposed by the control board 15 and the cell 16 on communication through the antennas 18 and 19 is reduced, making it possible to secure a better communication state of the antennas 18 and 19.

Furthermore, the speaker 30 and the cell 30 are positioned side by side with each other in directions substantially perpendicular to the directions in which the control board 15 and the cell 16 are side by side with each other.

Accordingly, as the directions in which the control board 15 and the cell 16 are side by side with each other are substantially perpendicular to the directions in which the speaker 30 and the cell 16 are side by side with each other, the acoustic output device 1 is not increased in size in one direction and can be reduced in size.

In addition, since the speaker 30 and the antennas 18 and 19 are positioned on opposite sides of the cell 16 in sandwiching relation thereto, the effect imposed by the speaker 30 on communication through the antennas 18 and 19 is reduced, making it possible to secure a good communication state with respect to the antennas 18 and 19.

Incidentally, in the acoustic output device 1, the cell 16 has its axial directions slightly inclined to the thicknesswise directions of the control board 15 such that the other surface 16b of the cell 16 is closer to the second surface 15b of the control board 15.

Figure 10:
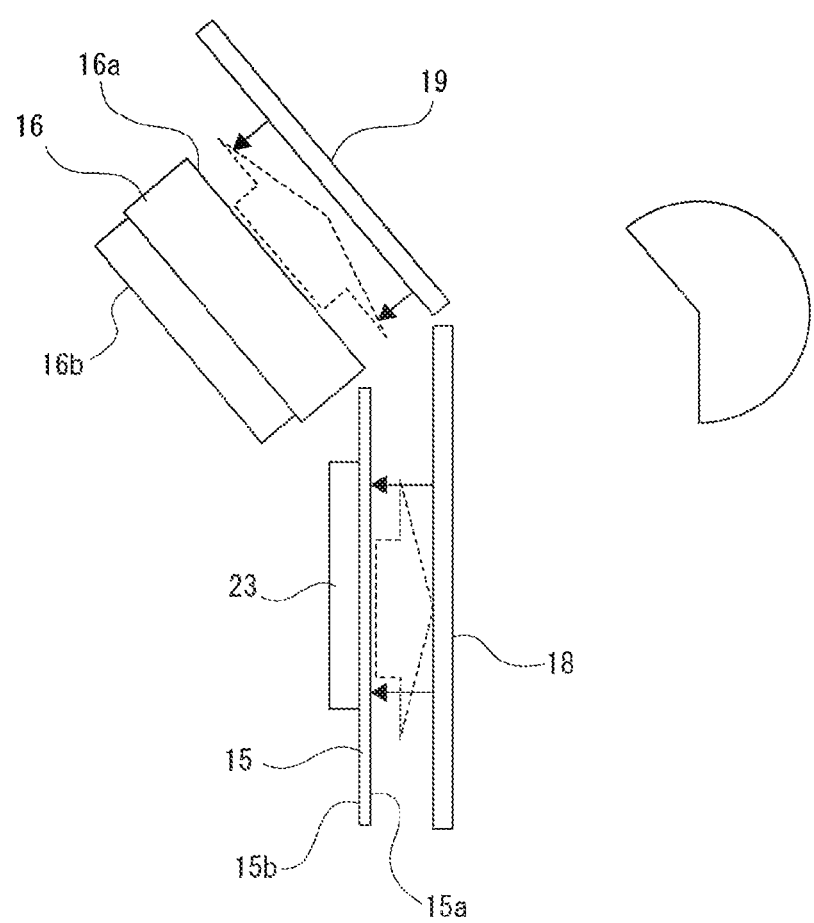
FIG. 10 is a view schematically illustrating how radio waves are propagated.

Therefore, with the control board 15 and the cell 16 being disposed in such an orientation, it is easier for radio waves to be propagated in a wider range, making it possible to secure good performance of the antennas 18 and 19 (see FIG. 10). Incidentally, FIG. 10 is a view schematically illustrating how radio waves are propagated, with solid-line arrows illustrating the state of radio waves propagated from the antennas 18 and 19 toward structural objects, i.e., the control board 15 and the cell 16, and dotted-line arrows illustrating the state of radio waves reflected by the structural objects, i.e., the control board 15 and the cell 16. Further, a right-hand figure in FIG. 10 is a figure schematically illustrating a direction of propagation of the radio waves reflected by the structural objects.

Moreover, the acoustic output device 1 is arranged in a so-called dipole-type configuration with the two antennas 18 and 19, and is capable of increasing the distance over which radio waves are propagated and also of increasing directivity, compared with an acoustic output device of a so-called monopole type configuration with a single antenna.

Other Examples of Acoustic Output Device

Figure 11:
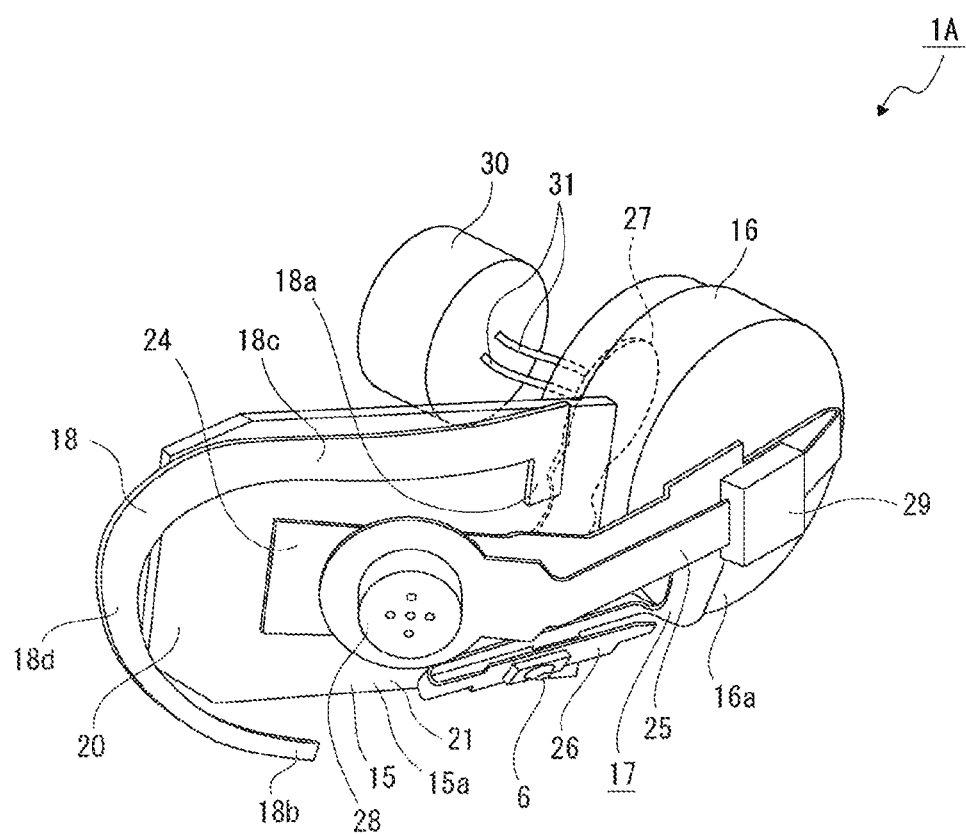
FIG. 11 is a perspective view illustrating an internal structure of an acoustic output device with a single antenna.
Figure 12:
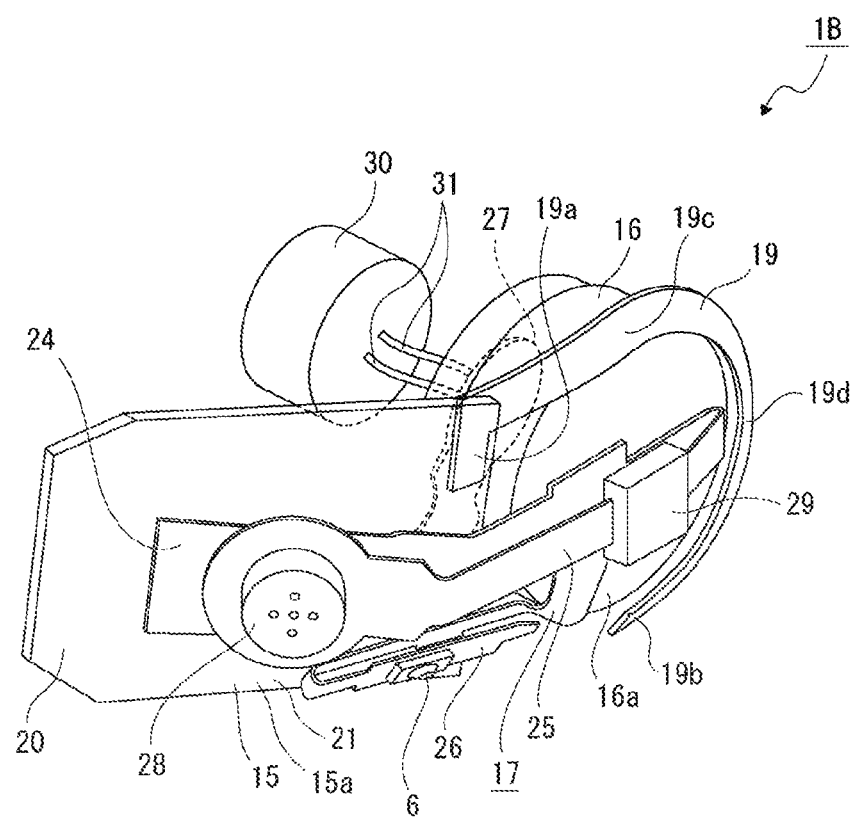
FIG. 12 is a perspective view illustrating an internal structure of another acoustic output device with a single antenna.

In the foregoing, the acoustic output device 1 with the antennas 18 and 19 is illustrated by way of example. For example, it is possible to use an acoustic output device 1A (see FIG. 11) of a configuration having the antenna 18 and free of the antenna 19, instead of the acoustic output device 1. Furthermore, it is also possible to use an acoustic output device 1B (see FIG. 12) of a configuration having the antenna 19 and free of the antenna 18, instead of the acoustic output device 1.

Measurement Results

Measurement results with respect to the performance of the antennas of the acoustic output device 1, the acoustic output device 1A, and the acoustic output device 1B described above will hereinafter be described (see FIGS. 13 through 15). The acoustic output device 1A and the acoustic output device 1B are arranged in a so-called monopole type configuration with the single antenna 18 or the single antenna 19, whereas the acoustic output device 1 is arranged in a so-called dipole-type configuration with the two antennas 18 and 19. Measurement results are results representing electric field distributions determined when communicating with the acoustic output device 1A, the acoustic output device 1B, and the acoustic output device 1 with radio waves of the same intensity.

Figure 9:
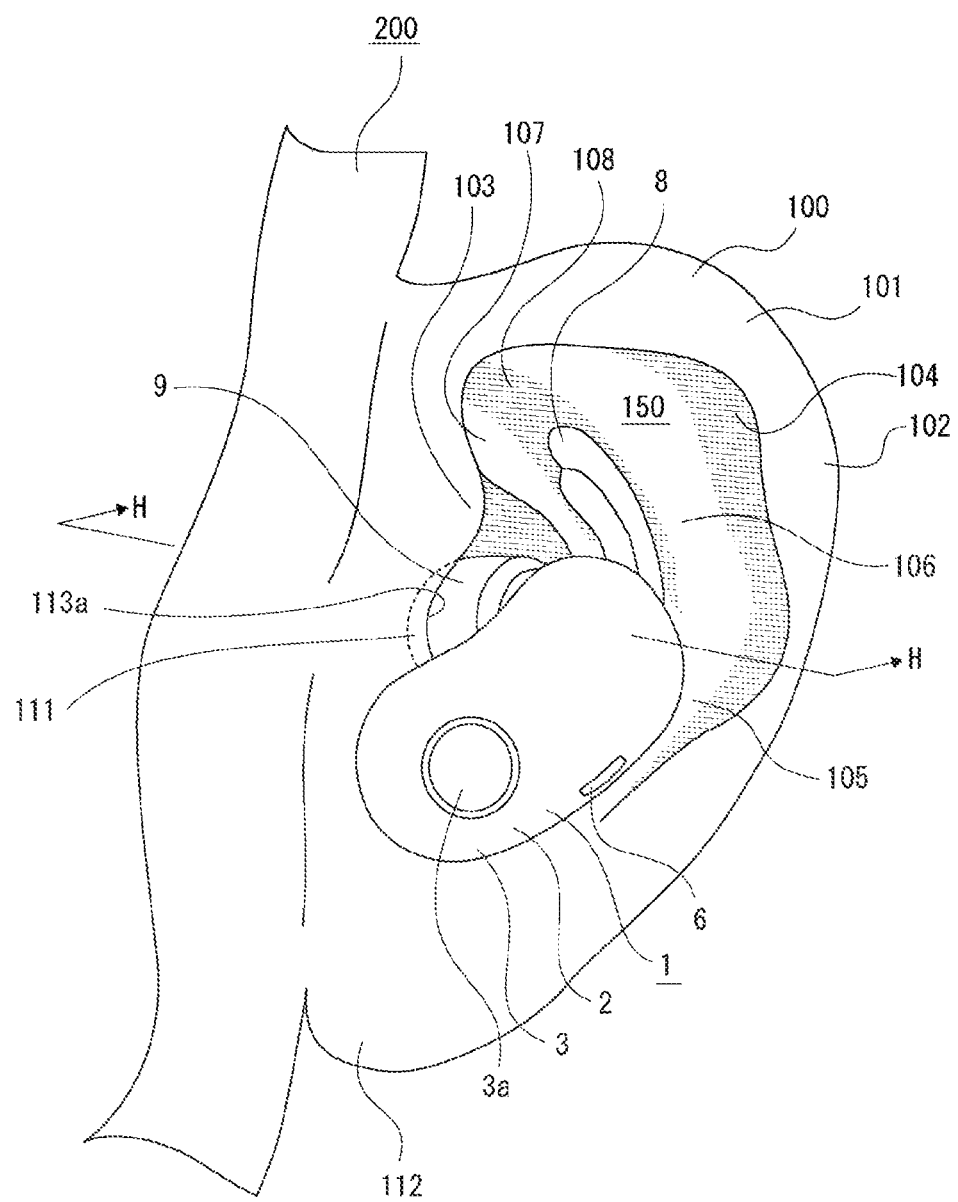
FIG. 9 is a perspective view illustrating the manner in which the acoustic output device is mounted on the ear.
Figure 13:
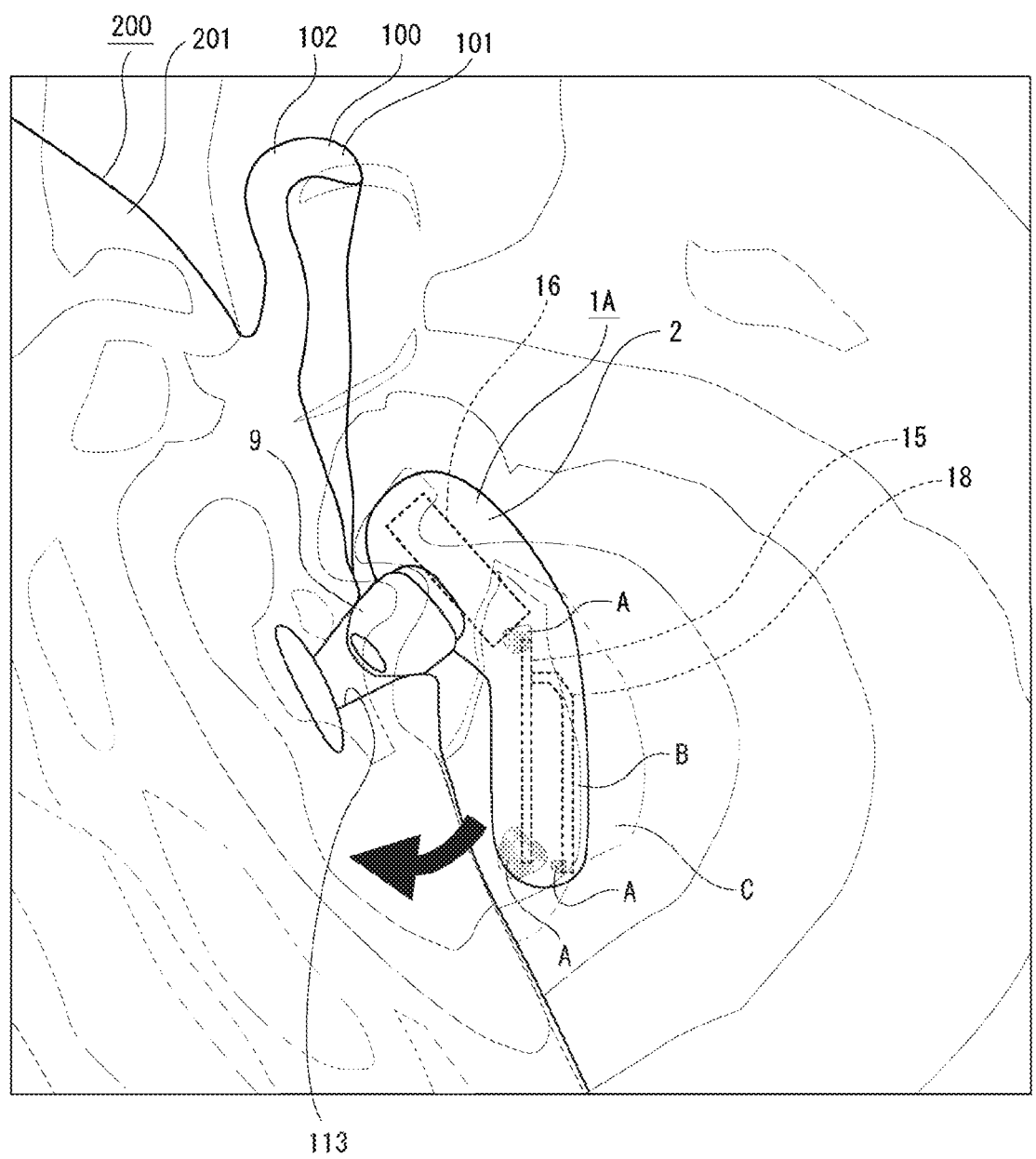
FIG. 13, together with FIGS. 14 and 15, illustrates measurement results with respect to the performance of an antenna, the present figure being illustrative of measurement results with respect to the performance of an antenna in an acoustic output device in which the antenna is disposed on a control board side.
Figure 13:
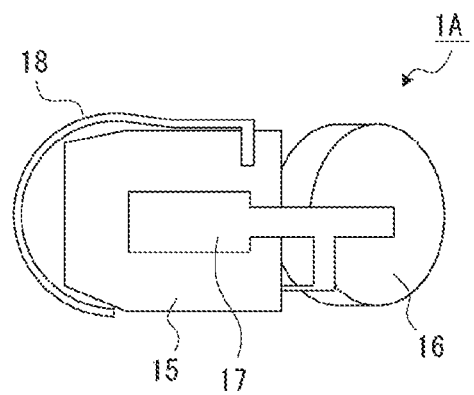
Figure 14:
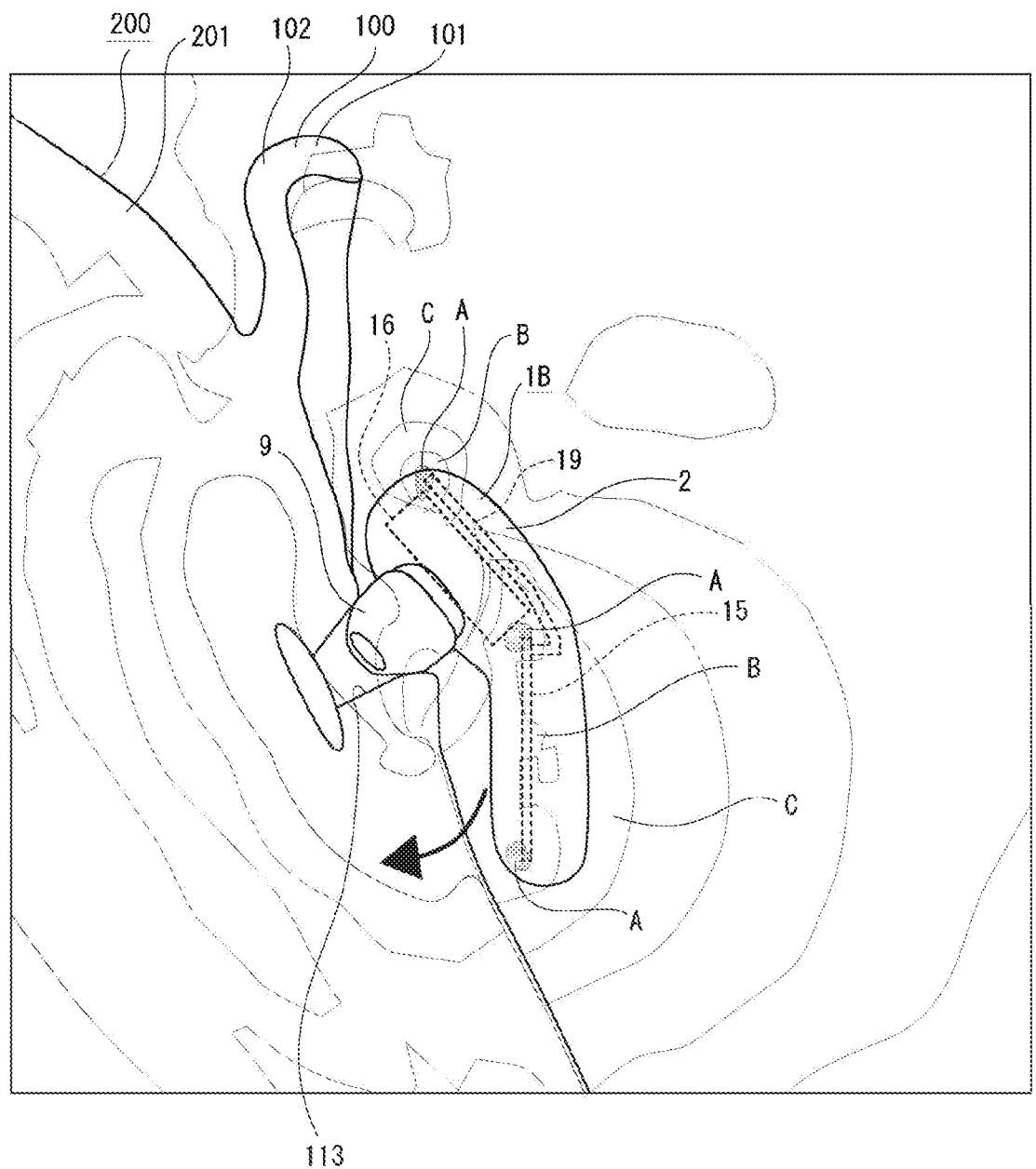
FIG. 14 is a view illustrating measurement results with respect to the performance of an antenna in an acoustic output device in which the antenna is disposed on a cell side.
Figure 14:
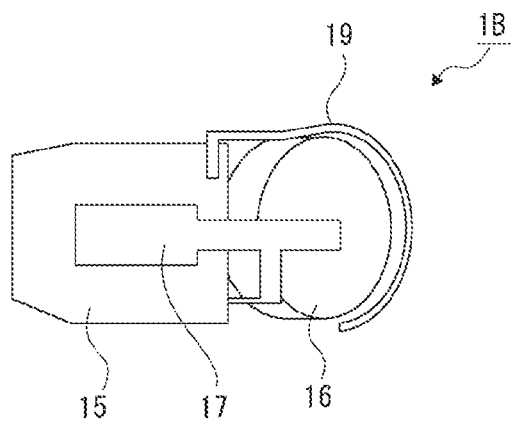
Figure 15:
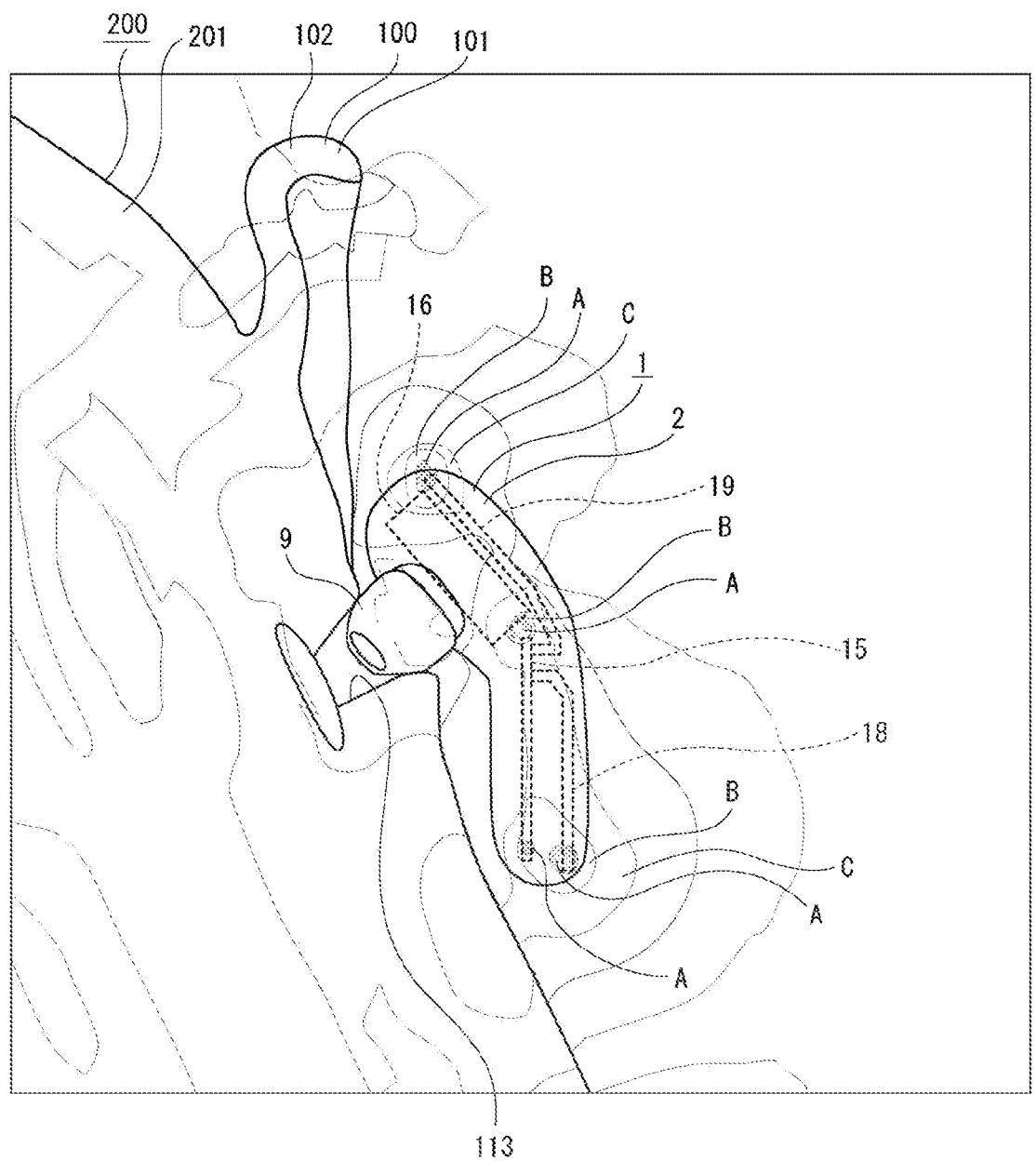
FIG. 15 is a view illustrating measurement results with respect to the performance of antennas in an acoustic output device in which the antennas are disposed on a control board side and a cell side.
Figure 15:
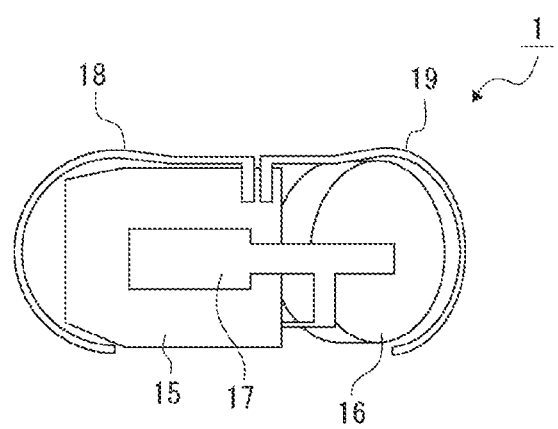

FIGS. 13 through 15 illustrate horizontal cross sections at the position of the external acoustic meatus 113 of the ear 100, depicting electric field distributions in a H-H cross section of FIG. 9.

FIG. 13 illustrates measurement results with respect to the acoustic output device 1A, FIG. 14 illustrates measurement results with respect to the acoustic output device 1B, and FIG. 15 illustrates measurement results with respect to the acoustic output device 1. In each of FIGS. 13 through 15, areas A, illustrated shaded, are areas where the electric field is of the strongest intensity, an area B around the areas A is an area where the electric field is of an intensity next to the areas A, and an area C around the area B is an area where the electric field is of an intensity next to the area B. Similarly, in areas demarcated by the solid lines around the area C, the electric field is progressively weaker in an outward direction from the area C.

The acoustic output device 1A produced results that electric power radiated as radio waves toward the human body in response to electric power input to the antenna 18 is large, causing a slightly large loss of radiation efficiency, though the loss was not large enough to greatly impair the performance of the antenna 18, and sufficient communication performance of the antenna 18 was fulfilled. Incidentally, in FIG. 13, the electric power radiated as radio waves toward the human body is conceptually indicated by a thick arrow.

The acoustic output device 1B produced results that electric power radiated as radio waves toward the human body in response to electric power input to the antenna 18 is smaller than with the acoustic output device 1A, causing a smaller loss of radiation efficiency than with the acoustic output device 1A, and sufficient communication performance of the antenna 19 was fulfilled. Incidentally, in FIG. 14, the electric power radiated as radio waves toward the human body is conceptually indicated by a thin arrow.

The acoustic output device 1 produced results that electric power radiated as radio waves toward the human body in response to electric power input to the antenna 18 is smaller than with the acoustic output device 1A and the acoustic output device 1B, causing a small loss of radiation efficiency, and sufficient communication performance of the antennas 18 and 19 was fulfilled.

Incidentally, the radiation of electric power, i.e., radio waves, toward the human body is considered to be caused by a radiation from the charging terminals 22, 22, 22. Therefore, in the acoustic output devices 1, 1A, and 1B, in order to reduce the amount of radiation of electric power, i.e., radio waves, to the human body, it is possible to position the charging terminals 22, 22, 22 on a side of the acoustic output devices 1, 1A, and 1B different from the human body side thereof, e.g., on a side opposite the human body side, while the acoustic output devices 1, 1A, and 1B are mounted on the ear 100.

Furthermore, the charging terminals 22, 22, 22 are connected to the control board 15. In the case in which a single antenna is provided, the antenna 19 should more preferably be disposed on the cell 16 side only in order to reduce the amount of radiation of electric power, i.e., radio waves, from the charging terminals 22, 22, 22.

Moreover, while the acoustic output devices 1, 1A, and 1B are mounted on the ear 100, since the cell 16 is positioned on the auricle 100 side and the control board 15 is positioned closer to the cheek than the auricle 101, in the case in which a single antenna is provided, the antenna 19 should more preferably be disposed on the cell 16 side only in order to reduce the amount of radiation of electric power, i.e., radio waves, to the human body.

Other Layouts of Control Board and Cell

Other layouts of the control board 15 and the cell 16 will hereinafter be described (see FIGS. 16 and 17).

In the foregoing, the example in which the control board 15 and the cell 16 are disposed such that the axial directions of the cell 16 are slightly inclined to the thicknesswise directions of the control board 15 has been illustrated. However, as described hereinafter, the control board 15 and the cell 16 may be disposed such that the axial directions of the cell 16 and the thicknesswise directions of the control board 15 are the same as each other.

In such a layout, the first surface 15a of the control board 15 and the one surface 16a of the cell 16 face in the same direction, and the second surface 15b of the control board 15 and the other surface 16b of the cell 16 face in the same direction.

The antenna 18 is positioned side by side with the control board 15 in the thicknesswise directions of the control board 15, and is positioned along the outer peripheral portion of the control board 15.

Therefore, since the cell 16 and the control board 15 are positioned side by side with each other in directions different from the thicknesswise directions of the control board 15 and the antenna 18 is positioned side by side with the control board 15 in the thicknesswise directions of the control board 15, a good communication state with respect to the antenna 18 can be secured and the acoustic output device 1 can be reduced in size.

The antenna 19 is positioned side by side with the cell 16 in the facing direction in which the one surface 16a of the cell 16 faces, and is positioned along the outer peripheral region of the cell 16.

Therefore, since the control board 15 and the cell 16 are positioned side by side with each other in directions different from the thicknesswise directions of the control board 15 and the antenna 19 is positioned side by side with the cell 16 in the facing direction, a good communication state with respect to the antenna 19 can be secured and the acoustic output device 1 can be reduced in size.

Figure 16:
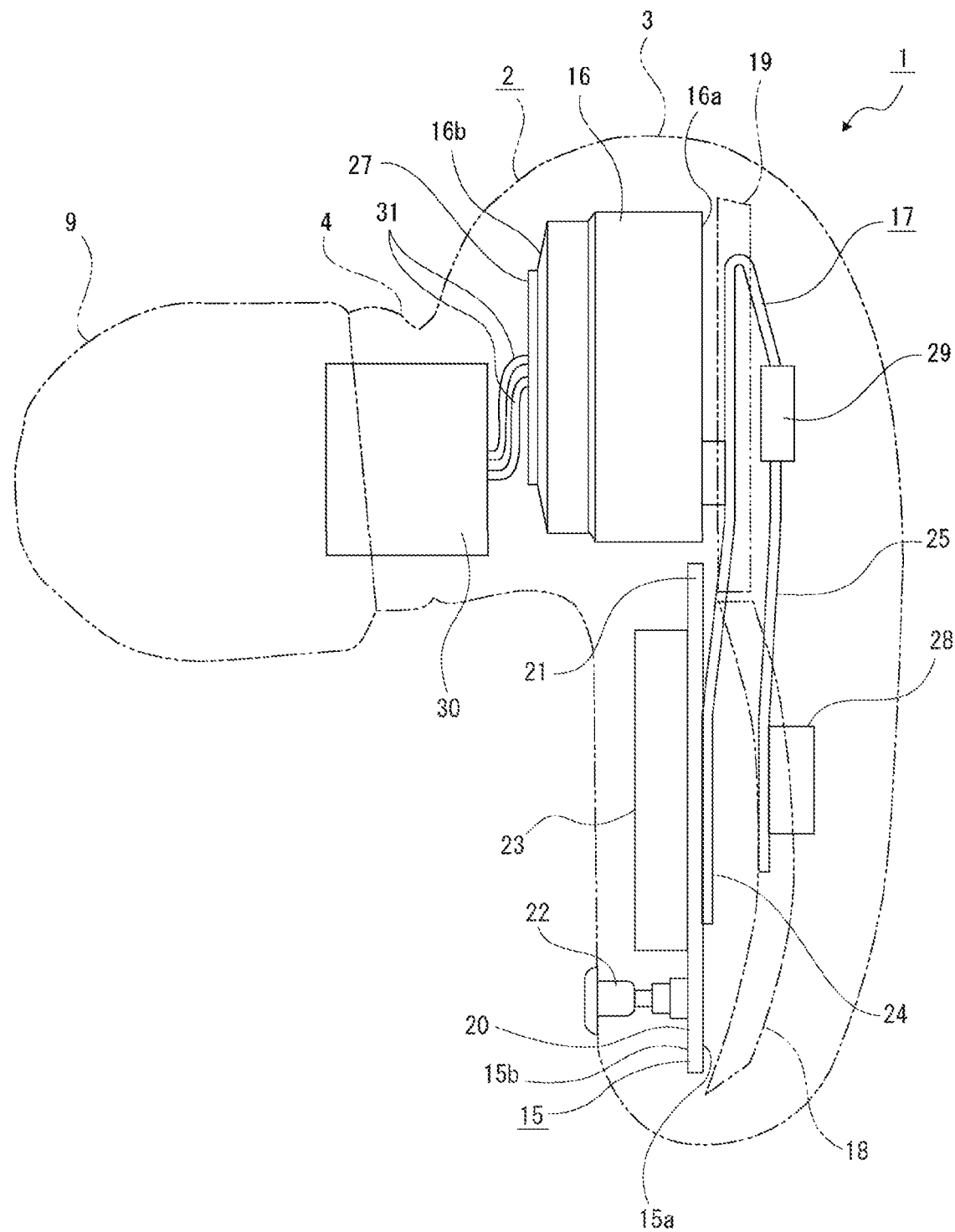
FIG. 16 illustrates an example of another layout of a control board and a cell.

As described above, according to the configuration in which the control board 15 and the cell 16 are disposed such that the axial directions of the cell 16 and the thicknesswise directions of the control board 15 are the same as each other, the direction in which the protrusive portion 4 protrudes from the main body portion 3 may be the same as the axial directions of the cell 16 (see FIG. 16). In this case, the speaker 30 is disposed in the protrusive portion 4 in such an orientation that the axial directions of the speaker 30 are aligned with the axial directions of the cell 16.

Figure 17:
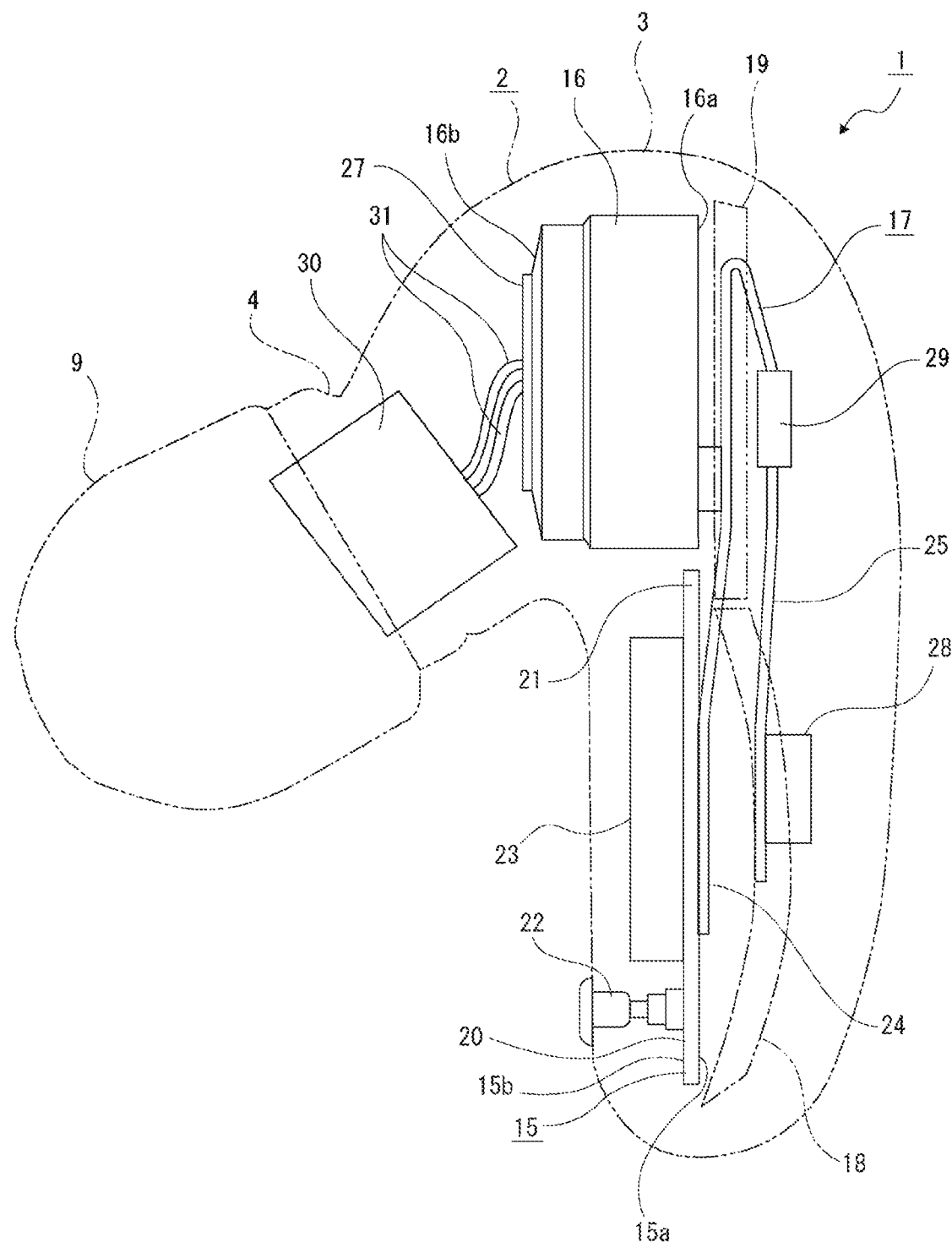
FIG. 17 illustrates another example of still another layout of a control board and a cell.

Furthermore, according to the configuration in which the control board 15 and the cell 16 are disposed such that the axial directions of the cell 16 and the thicknesswise directions of the control board 15 are the same as each other, the direction in which the protrusive portion 4 protrudes from the main body portion 3 may be inclined to the axial directions of the cell 16 (see FIG. 17).

In this case, the speaker 30 is disposed in the protrusive portion 4 in such an orientation that the axial directions of the speaker 30 are inclined to the axial directions of the cell 16.

Present Technology

The present technology may be configured as follows:

(1)
An acoustic output device including:
a speaker for outputting sound;
a cell having one surface facing in a facing direction represented by a predetermined direction;
a control board for controlling predetermined parts; and
an antenna for sending and receiving signals, the antenna having at least a portion spaced from the control board and the cell,
in which the cell and the control board are positioned side by side with each other in directions different from thicknesswise directions of the control board,
the facing direction is different from the directions in which the cell and the control board are side by side with each other, and
the antenna is positioned side by side with at least one of the control board or the cell in the thicknesswise directions or the facing direction.

(2)
The acoustic output device according to (1), in which the antenna is positioned side by side with the control board in the thicknesswise directions.

(3)
The acoustic output device according to (2), in which the antenna is positioned along an outer peripheral region of the control board.

(4)
The acoustic output device according to (3), further including:
a case body in which the speaker, the control board, the cell, and the antenna are disposed,
in which the case body has an end portion provided as a curved surface portion that is protruding outwardly, opposite a side of the case body where the cell is disposed in the directions in which the control board and the cell are side by side with each other, and
the antenna has a portion positioned along an inner surface of the curved surface portion.

(5)
The acoustic output device according to (3) or (4), in which a control circuit having a circuit pattern is formed on the control board, and
the control board includes a non-formed region free of the control circuit and electronic parts, in at least part of an outer peripheral portion thereof.

(6)
The acoustic output device according to (1), in which the antenna is positioned side by side with the cell in a direction in which the one surface faces.

(7)
The acoustic output device according to (6), in which the antenna is positioned along an outer peripheral region of the cell.

(8)
The acoustic output device according to (7), further including:
a case body in which the speaker, the control board, the cell, and the antenna are disposed,
in which the case body has an end portion provided as a curved surface portion that is protruding outwardly, opposite a side of the case body where the control board is disposed in the directions in which the control board and the cell are side by side with each other, and
the antenna has a portion positioned along an inner surface of the curved surface portion.

(9)
The acoustic output device according to (1), in which the antenna includes two antennas,
one of the antennas is positioned side by side with the control board in the thickness directions, and
the other of the antennas is positioned side by side with the cell in a direction in which the one surface faces.

(10)
The acoustic output device according to (9), in which the one of the antennas is positioned along an outer peripheral region of the control board, and
the other of the antennas is positioned along an outer peripheral region of the cell.

(11)
The acoustic output device according to (10), further including:
a case body in which the speaker, the control board, the cell, and the antenna are disposed,
in which the case body has both end portions provided as curved surface portions that are protruding outwardly, in the directions in which the control board and the cell are side by side with each other, and
the two antennas have respective portions positioned along inner surfaces of the curved surface portions.

(12)
The acoustic output device according to any one of (9) through (11), in which the two antennas are formed in symmetrical shapes and disposed in symmetrical positions.

(13)
The acoustic output device according to any one of (1) through (12), in which the antenna has an end portion connected to the control board, and
the antenna has a portion other than the end portion, positioned in spaced relation to the control board or the cell.

(14)
The acoustic output device according to any one of (1) through (13), in which the speaker and the cell are positioned side by side with each other in directions substantially perpendicular to the directions in which the control board and the cell are side by side with each other.

(15)
The acoustic output device according to any one of (1) through (14), in which the speaker and the antenna are positioned on opposite sides of the cell in sandwiching relation thereto.

(16)

The acoustic output device according to any one of (1) through (15), in which the acoustic output device is positioned in its entirety inwardly of an outer peripheral region of an ear while the acoustic output device is mounted on the ear.

(17)

The acoustic output device according to (16), further including:

a mounting assistance member configured to engage an inner peripheral edge of an upper limb of antihelix of the ear while the acoustic output device is mounted on the ear.

REFERENCE SIGNS LIST

100 . . . Ear, 106 . . . Upper limb of antihelix, 1 . . . Acoustic output device, 2 . . . Case body, 8 . . . Mounting assistance member, 12 . . . First curved surface portion, 13 . . . Second curved surface portion, 15 . . . Control board, 16 . . . Cell, 16a . . . One surface, 18 . . . Antenna, 18a . . . End portion, 19 . . . Antenna, 19a . . . End portion, 20a . . . Non-formed region, 30 . . . Speaker, 1A . . . Acoustic output device, 1B . . . Acoustic output device

The invention claimed is:

1. An acoustic output device, comprising:
a speaker configured to output sound;
a cell having one surface facing in a facing direction represented by a specific direction;
a control board configured to control specific parts; and
an antenna configured to send and receive signals, wherein
the antenna has at least a portion spaced from the control board and the cell,
the cell and the control board are positioned side by side with each other in a direction different from a thicknesswise direction of the control board,
the facing direction is different from the direction in which the cell and the control board are side by side with each other, and
the antenna is positioned side by side with at least one of the control board or the cell in the thicknesswise direction or the facing direction.

2. The acoustic output device according to claim 1, wherein the antenna is positioned side by side with the control board in the thicknesswise direction.

3. The acoustic output device according to claim 2, wherein the antenna is positioned along an outer peripheral region of the control board.

4. The acoustic output device according to claim 3, further comprising:
a case body in which the speaker, the control board, the cell, and the antenna are disposed, wherein
the case body has an end portion provided as a curved surface portion that is protruding outwardly, on a side of the case body where the control board is disposed in the direction in which the control board and the cell are side by side with each other, and
the antenna has a portion positioned along an inner surface of the curved surface portion.

5. The acoustic output device according to claim 3, wherein
a control circuit having a circuit pattern is on the control board, and
the control board includes a non-formed region free of the control circuit and electronic parts, in at least part of an outer peripheral portion thereof.

6. The acoustic output device according to claim 1, wherein the antenna is positioned side by side with the cell in the facing direction.

7. The acoustic output device according to claim 6, wherein the antenna is positioned along an outer peripheral region of the cell.

8. The acoustic output device according to claim 7, further comprising:
a case body in which the speaker, the control board, the cell, and the antenna are disposed, wherein
the case body has an end portion provided as a curved surface portion that is protruding outwardly, on a side of the case body where the cell is disposed in the direction in which the control board and the cell are side by side with each other, and
the antenna has a portion positioned along an inner surface of the curved surface portion.

9. The acoustic output device according to claim 1, wherein
the antenna includes two antennas,
a first antenna of the two antennas is positioned side by side with the control board in the thickness direction, and
a second antenna of the two antennas is positioned side by side with the cell in the facing direction.

10. The acoustic output device according to claim 9, wherein
the first antenna is positioned along an outer peripheral region of the control board, and
the second antenna is positioned along an outer peripheral region of the cell.

11. The acoustic output device according to claim 10, further comprising:
a case body in which the speaker, the control board, the cell, and the antenna are disposed, wherein
the case body has both end portions provided as curved surface portions that are protruding outwardly, in the direction in which the control board and the cell are side by side with each other, and
the two antennas have respective portions positioned along inner surfaces of the curved surface portions.

12. The acoustic output device according to claim 9, wherein the two antennas are in symmetrical shapes and in symmetrical positions.

13. The acoustic output device according to claim 1, wherein
the antenna has an end portion connected to the control board, and
the antenna has a portion other than the end portion, positioned in spaced relation to the control board or the cell.

14. The acoustic output device according to claim 1, wherein the speaker and the cell are positioned side by side with each other in a direction substantially perpendicular to the direction in which the control board and the cell are side by side with each other.

15. The acoustic output device according to claim 1, wherein the speaker and the antenna are positioned on opposite sides of the cell in sandwiching relation thereto.

16. The acoustic output device according to claim 1, wherein the acoustic output device is positioned in its entirety inwardly of an outer peripheral region of an ear while the acoustic output device is mounted on the ear.

17. The acoustic output device according to claim 16, further comprising:
a mounting assistance member configured to engage an inner peripheral edge of an upper limb of antihelix of the ear while the acoustic output device is mounted on the ear.

* * * * *